US012701263B2

(12) United States Patent
Chujoh et al.

(10) Patent No.: US 12,701,263 B2
(45) Date of Patent: Aug. 4, 2026

(54) CODING APPARATUS, DECODING APPARATUS AND COMPUTER-READABLE RECORDING MEDIUM FOR ENCODING/DECODING VIDEO DATA USING SYNTAX ELEMENTS AND WEIGHT COEFFICIENTS

(71) Applicant: SHARP KABUSHIKI KAISHA, Sakai City (JP)

(72) Inventors: Takeshi Chujoh, Sakai City (JP); Tomohiro Ikai, Sakai City (JP); Tomoko Aono, Sakai City (JP); Eiichi Sasaki, Sakai City (JP); Tomonori Hashimoto, Sakai City (JP); Tianyang Zhou, Sakai City (JP); Yukinobu Yasugi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/928,813

(22) Filed: Oct. 28, 2024

(65) Prior Publication Data

US 2025/0056039 A1 Feb. 13, 2025

Related U.S. Application Data

(63) Continuation of application No. 18/207,703, filed on Jun. 9, 2023, now Pat. No. 12,184,891, which is a
(Continued)

(30) Foreign Application Priority Data

Mar. 17, 2020 (JP) ................................. 2020-046124

(51) Int. Cl.
*H04N 19/577* (2014.01)
*H04N 19/105* (2014.01)
(Continued)

(52) U.S. Cl.
CPC ......... *H04N 19/577* (2014.11); *H04N 19/105* (2014.11); *H04N 19/159* (2014.11);
(Continued)

(58) Field of Classification Search
CPC .. H04N 19/577; H04N 19/105; H04N 19/159; H04N 19/176; H04N 19/46;
(Continued)

(56) References Cited

U.S. PATENT DOCUMENTS

2009/0086822 A1 4/2009 Chujoh et al.
2013/0107952 A1 5/2013 Cohan et al.
(Continued)

FOREIGN PATENT DOCUMENTS

GB 2592997 A 9/2021
WO 2021/145668 A1 7/2021

OTHER PUBLICATIONS

Benjamin Bross et al., "Versatile Video Coding (Draft 8)", JVET-Q2001-vE, Joint Video Experts Team (JVET) of ITU-T SG 16 WP 3 and ISO/IEC JTC 1/SC 29/WG 11, 17th Meeting: Brussels, BE, Jan. 7-17, 2020.
(Continued)

*Primary Examiner* — Marnie A Matt
(74) *Attorney, Agent, or Firm* — ScienBiziP, P.C.

(57) ABSTRACT

An apparatus that decodes (or codes) multiple syntax elements, including a first syntax element and a second syntax element, is provided. The first syntax element is associated with a picture parameter set and the second syntax element is associated with a slice header. The apparatus derives a weight coefficient according to the first and second syntax elements, and generates a prediction image using the weight coefficient.

3 Claims, 26 Drawing Sheets

Related U.S. Application Data continuation of application No. 17/681,615, filed on Feb. 25, 2022, now Pat. No. 11,716,486, which is a continuation of application No. 17/201,627, filed on Mar. 15, 2021, now Pat. No. 11,303,927.

(51) Int. Cl.

| | |
|---|---|
| *H04N 19/159* | (2014.01) |
| *H04N 19/176* | (2014.01) |
| *H04N 19/46* | (2014.01) |
| *H04N 19/59* | (2014.01) |

(52) U.S. Cl.

CPC ........... *H04N 19/176* (2014.11); *H04N 19/46* (2014.11); *H04N 19/59* (2014.11)

(58) Field of Classification Search

CPC ...... H04N 19/59; H04N 19/11; H04N 19/172; H04N 19/30; H04N 19/587; H04N 19/70

USPC .................................................. 375/240.12

See application file for complete search history.

(56) References Cited

U.S. PATENT DOCUMENTS

| | | |
|---|---|---|
| 2013/0336399 A1 | 12/2013 | Yu et al. |
| 2015/0271514 A1 | 9/2015 | Yoshikawa et al. |
| 2020/0204807 A1 | 6/2020 | Ye |
| 2021/0136419 A1* | 5/2021 | Hsiang ................. H04N 19/184 |
| 2021/0235116 A1 | 7/2021 | Sullivan et al. |
| 2022/0201336 A1* | 6/2022 | Filippov .............. H04N 19/577 |
| 2022/0353523 A1 | 11/2022 | Paluri et al. |
| 2022/0400290 A1* | 12/2022 | Wang ..................... H04N 19/50 |
| 2023/0100733 A1* | 3/2023 | Paluri ................... H04N 19/51 |
| | | 375/240.12 |
| 2023/0108509 A1 | 4/2023 | Laroche et al. |

OTHER PUBLICATIONS

M. Winken et al., "Weighted Multi-Hypothesis Inter Prediction for Video Coding," 2019 Picture Coding Symposium (PCS), 2019, pp. 1-5, doi: 10.1109/PCS48520.2019.8954505. (Year: 2019).

Athanasios Leontaris et al., "Weighted Prediction Methods for Improved Motion Compensation," 2009, UTC from IEEE Xplore, 2009, pp. 1029-1032 (Year: 2009).

Notice of Allowance and Fees Due issued on Dec. 13, 2021 for U.S. Appl. No. 17/201,627.

Notice of the Office communication issued on Dec. 15, 2022 for U.S. Appl. No. 17/681,615.

Notice of Allowance and Fees Due issued on Mar. 14, 2023 for U.S. Appl. No. 17/681,615.

A. Tanizawa, T. Chujoh and T. Yamakage, "Multi-directional implicit weighted prediction based on image characteristics of reference pictures for inter coding," 2012 19th IEEE International Conference on Image Processing, 2012, pp. 1545-1548, doi: 10.1109/ICIP.2012.6467167. (Year: 2012).

A. Tanizawa and T. Chujoh, "Efficient weighted prediction parameter signaling using parameter prediction and direct derivation," 2013 IEEE International Conference on Image Processing, 2013, pp. 1900-1903, doi: 10.1109/ICIP.2013.6738391. Date of Conference: Sep. 15-18, 2013.

Non-Final Office Action issued on Apr. 11, 2024 for U.S. Appl. No. 18/207,703.

Notice of Allowance and Fees Due issued on Aug. 23, 2024 for U.S. Appl. No. 18/207,703.

\* cited by examiner

FIG. 15A

| seq_parameter_set_rbsp( ) { | Descriptor |
|---|---|
|   sps_decoding_parameter_set_id | ue(4) |
|   sps_video_parameter_set_id | ue(4) |
|   ... | |
|   sps_weighted_pred_flag | u(1) |
|   sps_weighted_bipred_flag | u(1) |
|   ... | |
|   long_term_ref_pics_flag | u(1) |
|   inter_layer_ref_pics_present_flag | u(1) |
|   sps_idr_rpl_present_flag | u(1) |
|   rpl1_same_as_rpl0_flag | u(1) |
|   for( i = 0; i < rpl1_same_as_rpl0_flag ? 1 : 2; i++ ) { | |
|     num_ref_pic_lists_in_sps[ i ] | ue(v) |
|     for( j = 0; j < num_ref_pic_lists_in_sps[ i ]; j++ ) | |
|       ref_pic_list_struct( i, j ) | |
|   } | |
|   ... | |
| } | |

FIG. 15B

| pic_parameter_set_rbsp( ) { | Descriptor |
|---|---|
|   ... | |
|   for( i = 0; i < 2; i++ ) | |
|     num_ref_idx_default_active_minus1[ i ] | ue(v) |
|   ... | |
|   pps_weighted_pred_flag | u(1) |
|   pps_weighted_bipred_flag | u(1) |
|   ... | |
|   rpl_info_in_ph_flag | u(1) |
|   ... | |
|   if( ( pps_weighted_pred_flag || pps_weighted_bipred_flag ) &&     rpl_present_in_ph_flag ) | |
|       wp_info_in_ph_flag | u(1) |
|   ... | |
| } | |

| picture_header_structure( ) { | Descriptor |
|---|---|
| ... | |
|   ph_inter_slice_allowed_flag | u(1) |
| ... | |
|   if( rpl_info_in_ph_flag ) | |
|     ref_pic_lists( ) | |
| ... | |
|   if( ph_inter_slice_allowed_flag ) { | |
| ... | |
|     if( sps_temporal_mvp_enabled_flag ) { | |
|       ph_temporal_mvp_enabled_flag | u(1) |
|       if( ph_temporal_mvp_enabled_flag && rpl_info_in_ph_flag ) { | |
|         ph_collocated_from_l0_flag | u(1) |
|         if( ( ph_collocated_from_l0_flag && | |
|           num_ref_entries[ 0 ][ RplsIdx[ 0 ] ] > 1 ) \|\| | |
|           ( !ph_collocated_from_l0_flag && | |
|           num_ref_entries[ 1 ][ RplsIdx[ 1 ] ] > 1 ) ) | |
|           ph_collocated_ref_idx | ue(v) |
|       } | |
|     } | |
| ... | |
|     if( ( pps_weighted_pred_flag \|\| pps_weighted_bipred_flag ) && wp_info_in_ph_flag ) | |
|       pred_weight_table( ) | |
|   } | |
| ... | |
| } | |

| slice_header( ) { | Descriptor |
|---|---|
| ... | |
| if( !rpl_info_in_ph_flag && ( ( nal_unit_type != IDR_W_RADL && nal_unit_type != IDR_N_LP ) \|\| sps_idr_rpl_present_flag ) ) | |
| ref_pic_lists( ) | |
| if( ( rpl_info_in_ph_flag \|\| ( ( nal_unit_type != IDR_W_RADL && nal_unit_type != IDR_N_LP ) \|\| sps_idr_rpl_present_flag ) ) && ( slice_type != I && num_ref_entries[ 0 ][ RplsIdx[ 0 ] ] > 1 ) \|\| ( slice_type == B && num_ref_entries[ 1 ][ RplsIdx[ 1 ] ] > 1 ) ) ) { | |
| num_ref_idx_active_override_flag | u(1) |
| if( num_ref_idx_active_override_flag ) | |
| for( i = 0; i < ( slice_type == B ? 2: 1 ); i++ ) | |
| if( num_ref_entries[ i ][ RplsIdx[ i ] ] > 1 ) | |
| num_ref_idx_active_minus1[ i ] | ue(v) |
| } | |
| if( slice_type != I ) { | |
| ... | |
| if( ph_temporal_mvp_enabled_flag && !rpl_info_in_ph_flag ) { | |
| if( slice_type == B ) | |
| slice_collocated_from_l0_flag | u(1) |
| if( ( slice_collocated_from_l0_flag && NumRefIdxActive[ 0 ] > 1 ) \|\| ( !slice_collocated_from_l0_flag && NumRefIdxActive[ 1 ] > 1 ) ) | |
| slice_collocated_ref_idx | ue(v) |
| } | |
| if( !wp_info_in_ph_flag && ( ( pps_weighted_pred_flag && slice_type == P ) \|\| ( pps_weighted_bipred_flag && slice_type == B ) ) ) | |
| pred_weight_table( ) | |
| } | |
| ... | |
| } | |

FIG. 17B

```
for( i = 0; i < 2; i++ ) {
  if( slice_type == B || ( slice_type == P && i == 0 ) ) {
    if( num_ref_idx_active_override_flag )
      NumRefIdxActive[ i ] = num_ref_idx_active_minus1[ i ] + 1
    else {
      if( num_ref_entries[ i ][ RplsIdx[ i ] ] >= num_ref_idx_default_active_minus1[ i ] + 1 )
        NumRefIdxActive[ i ] = num_ref_idx_default_active_minus1[ i ] + 1
      else
        NumRefIdxActive[ i ] = num_ref_entries[ i ][ RplsIdx[ i ] ]
    }
  } else /* slice_type == I || ( slice_type == P && i == 1 ) */
    NumRefIdxActive[ i ] = 0
}
```

| pred_weight_table( ) { | Descriptor |
|---|---|
|   luma_log2_weight_denom | ue(v) |
|   if( ChromaArrayType != 0 ) | |
|     delta_chroma_log2_weight_denom | se(v) |
|   if( wp_info_in_ph_flag ) | |
|     num_l0_weights | ue(v) |
|   for( i = 0; i < NumWeightsL0; i++ ) | |
|     luma_weight_l0_flag[ i ] | u(1) |
|   if( ChromaArrayType != 0 ) | |
|     for( i = 0; i < NumWeightsL0; i++ ) | |
|       chroma_weight_l0_flag[ i ] | u(1) |
|   for( i = 0; i < NumWeightsL0; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( pps_weighted_bipred_flag && wp_info_in_ph_flag ) | |
|     num_l1_weights | ue(v) |
|   for( i = 0; i < NumWeightsL1; i++ ) | |
|     luma_weight_l1_flag[ i ] | u(1) |
|   if( ChromaArrayType != 0 ) | |
|     for( i = 0; i < NumWeightsL1; i++ ) | |
|       chroma_weight_l1_flag[ i ] | u(1) |
|   for( i = 0; i < NumWeightsL1; i++ ) { | |
|     if( luma_weight_l1_flag[ i ] ) { | |
|       delta_luma_weight_l1[ i ] | se(v) |
|       luma_offset_l1[ i ] | se(v) |
|     } | |
|     if( chroma_weight_l1_flag[ i ] ) | |
|       for( j = 0; j < 2; j++ ) { | |
|         delta_chroma_weight_l1[ i ][ j ] | se(v) |
|         delta_chroma_offset_l1[ i ][ j ] | se(v) |
|       } | |
|   } | |
| } | |

| ref_pic_lists( ) { | Descriptor |
|---|---|
| for( i = 0; i < 2; i++ ) { | |
| if( num_ref_pic_lists_in_sps[ i ] > 0 && | |
| ( i == 0 \|\| ( i == 1 && rpl1_idx_present_flag ) ) ) | |
| rpl_sps_flag[ i ] | u(1) |
| if( rpl_sps_flag[ i ] ) { | |
| if( num_ref_pic_lists_in_sps[ i ] > 1 && | |
| ( i == 0 \|\| ( i == 1 && rpl1_idx_present_flag ) ) ) | |
| rpl_idx[ i ] | u(v) |
| } else | |
| ref_pic_list_struct( i, num_ref_pic_lists_in_sps[ i ] ) | |
| for( j = 0; j < NumLtrpEntries[ i ][ RplsIdx[ i ] ]; j++ ) { | |
| if( ltrp_in_header_flag[ i ][ RplsIdx[ i ] ] ) | |
| poc_lsb_lt[ i ][ j ] | u(v) |
| delta_poc_msb_present_flag[ i ][ j ] | u(1) |
| if( delta_poc_msb_present_flag[ i ][ j ] ) | |
| delta_poc_msb_cycle_lt[ i ][ j ] | ue(v) |
| } | |
| } | |
| } | |
| } | |

FIG. 19B

| ref_pic_list_struct( listIdx, rplsIdx ) { | Descriptor |
|---|---|
| num_ref_entries[ listIdx ][ rplsIdx ] | ue(v) |
| if( long_term_ref_pics_flag ) | |
| ltrp_in_header_flag[ listIdx ][ rplsIdx ] | u(1) |
| for( i = 0, j = 0; i < num_ref_entries[ listIdx ][ rplsIdx ]; i++) { | |
| if( inter_layer_ref_pics_present_flag ) | |
| inter_layer_ref_pic_flag[ listIdx ][ rplsIdx ][ i ] | u(1) |
| if( !inter_layer_ref_pic_flag[ listIdx ][ rplsIdx ][ i ] ) { | |
| if( long_term_ref_pics_flag ) | |
| st_ref_pic_flag[ listIdx ][ rplsIdx ][ i ] | u(1) |
| if( st_ref_pic_flag[ listIdx ][ rplsIdx ][ i ] ) { | |
| abs_delta_poc_st[ listIdx ][ rplsIdx ][ i ] | ue(v) |
| if( AbsDeltaPocSt[ listIdx ][ rplsIdx ][ i ] > 0 ) | |
| strp_entry_sign_flag[ listIdx ][ rplsIdx ][ i ] | u(1) |
| } else if( !ltrp_in_header_flag[ listIdx ][ rplsIdx ] ) | |
| rpls_poc_lsb_lt[ listIdx ][ rplsIdx ][ j++ ] | u(v) |
| } else | |
| ilrp_idx[ listIdx ][ rplsIdx ][ i ] | ue(v) |
| } | |
| } | |

| ref_pic_list_struct( listIdx, rplsIdx ) { | Descriptor |
|---|---|
| num_ref_entries_minus1[ listIdx ][ rplsIdx ] | ue(v) |
| if( long_term_ref_pics_flag ) | |
| ltrp_in_header_flag[ listIdx ][ rplsIdx ] | u(1) |
| for( i = 0, j = 0; i <= num_ref_entries_minus1[ listIdx ][ rplsIdx ]; i++ ) { | |
| if( inter_layer_ref_pics_present_flag ) | |
| inter_layer_ref_pic_flag[ listIdx ][ rplsIdx ][ i ] | u(1) |
| if( !inter_layer_ref_pic_flag[ listIdx ][ rplsIdx ][ i ] ) { | |
| if( long_term_ref_pics_flag ) | |
| st_ref_pic_flag[ listIdx ][ rplsIdx ][ i ] | u(1) |
| if( st_ref_pic_flag[ listIdx ][ rplsIdx ][ i ] ) { | |
| abs_delta_poc_st[ listIdx ][ rplsIdx ][ i ] | ue(v) |
| if( AbsDeltaPocSt[ listIdx ][ rplsIdx ][ i ] > 0 ) | |
| strp_entry_sign_flag[ listIdx ][ rplsIdx ][ i ] | u(1) |
| } else if( !ltrp_in_header_flag[ listIdx ][ rplsIdx ] ) | |
| rpls_poc_lsb_lt[ listIdx ][ rplsIdx ][ j++ ] | u(v) |
| } else | |
| ilrp_idx[ listIdx ][ rplsIdx ][ i ] | ue(v) |
| } | |
| } | |

| picture_header_structure( ) { | Descriptor |
|---|---|
| ... | |
| if( ph_inter_slice_allowed_flag ) { | |
| ... | |
| if( ( pps_weighted_pred_flag \|\| pps_weighted_bipred_flag ) && wp_info_in_ph_flag ) | |
| NumWeightsL0 = num_ref_entries_minus1[ 0 ][RplsIdx[ 0 ]]+1 | |
| NumWeightsL1 = ((pps_weighted_bipred_flag)? num_ref_entries_minus1[ 1 ][ RplsIdx[ 1 ]]+1 : 0) | |
| pred_weight_table( ) | |
| } | |
| ... | |
| } | |

FIG. 21B

| slice_header( ) { | Descriptor |
|---|---|
| ... | |
| if( slice_type != I ) { | |
| ... | |
| if( !wp_info_in_ph_flag && ( ( pps_weighted_pred_flag && slice_type == P ) \|\| ( pps_weighted_bipred_flag && slice_type == B ) ) ) | |
| NumWeightsL0 = NumRefIdxActive[ 0 ] | |
| NumWeightsL1 = NumRefIdxActive[ 1 ] | |
| pred_weight_table( ) | |
| } | |
| ... | |
| } | |

| pred_weight_table( ) { | Descriptor |
|---|---|
| luma_log2_weight_denom | ue(v) |
| if( ChromaArrayType != 0 ) | |
| delta_chroma_log2_weight_denom | se(v) |
| for( i = 0; i < NumWeightsL0; i++ ) | |
| luma_weight_l0_flag[ i ] | u(1) |
| if( ChromaArrayType != 0 ) | |
| for( i = 0; i < NumWeightsL0; i++ ) | |
| chroma_weight_l0_flag[ i ] | u(1) |
| for( i = 0; i < NumWeightsL0; i++ ) { | |
| if( luma_weight_l0_flag[ i ] ) { | |
| delta_luma_weight_l0[ i ] | se(v) |
| luma_offset_l0[ i ] | se(v) |
| } | |
| if( chroma_weight_l0_flag[ i ] ) | |
| for( j = 0; j < 2; j++ ) { | |
| delta_chroma_weight_l0[ i ][ j ] | se(v) |
| delta_chroma_offset_l0[ i ][ j ] | se(v) |
| } | |
| } | |
| for( i = 0; i < NumWeightsL1; i++ ) | |
| luma_weight_l1_flag[ i ] | u(1) |
| if( ChromaArrayType != 0 ) | |
| for( i = 0; i < NumWeightsL1; i++ ) | |
| chroma_weight_l1_flag[ i ] | u(1) |
| for( i = 0; i < NumWeightsL1; i++ ) { | |
| if( luma_weight_l1_flag[ i ] ) { | |
| delta_luma_weight_l1[ i ] | se(v) |
| luma_offset_l1[ i ] | se(v) |
| } | |
| if( chroma_weight_l1_flag[ i ] ) | |
| for( j = 0; j < 2; j++ ) { | |
| delta_chroma_weight_l1[ i ][ j ] | se(v) |
| delta_chroma_offset_l1[ i ][ j ] | se(v) |
| } | |
| } | |
| } | |

FIG. 22

| pred_weight_table( ) { | Descriptor |
|---|---|
| luma_log2_weight_denom | ue(v) |
| if( ChromaArrayType != 0 ) | |
| delta_chroma_log2_weight_denom | se(v) |
| NumWeightsL0 = (wp_info_in_ph_flag) ? | |
| num_ref_entries_minus1[ 0 ][ RplsIdx[ 0 ] ]+1 : | |
| NumRefIdxActive[ 0 ] | |
| for( i = 0; i < NumWeightsL0; i++ ) | |
| luma_weight_l0_flag[ i ] | u(1) |
| if( ChromaArrayType != 0 ) | |
| for( i = 0; i < NumWeightsL0; i++ ) | |
| chroma_weight_l0_flag[ i ] | u(1) |
| for( i = 0; i < NumWeightsL0; i++ ) { | |
| if( luma_weight_l0_flag[ i ] ) { | |
| delta_luma_weight_l0[ i ] | se(v) |
| luma_offset_l0[ i ] | se(v) |
| } | |
| if( chroma_weight_l0_flag[ i ] ) | |
| for( j = 0; j < 2; j++ ) { | |
| delta_chroma_weight_l0[ i ][ j ] | se(v) |
| delta_chroma_offset_l0[ i ][ j ] | se(v) |
| } | |
| } | |
| NumWeightsL1 = (wp_info_in_ph_flag) ? | |
| ((pps_weighted_bipred_flag)? | |
| num_ref_entries_minus1[ 1 ][ RplsIdx[ 1 ] ]+1 : 0) | |
| : NumRefIdxActive[ 1 ] | |
| for( i = 0; i < NumWeightsL1; i++ ) | |
| luma_weight_l1_flag[ i ] | u(1) |
| if( ChromaArrayType != 0 ) | |
| for( i = 0; i < NumWeightsL1; i++ ) | |
| chroma_weight_l1_flag[ i ] | u(1) |
| for( i = 0; i < NumWeightsL1; i++ ) { | |
| if( luma_weight_l1_flag[ i ] ) { | |
| delta_luma_weight_l1[ i ] | se(v) |
| luma_offset_l1[ i ] | se(v) |
| } | |
| if( chroma_weight_l1_flag[ i ] ) | |
| for( j = 0; j < 2; j++ ) { | |
| delta_chroma_weight_l1[ i ][ j ] | se(v) |
| delta_chroma_offset_l1[ i ][ j ] | se(v) |
| } | |
| } | |
| } | |

| picture_header_structure( ) { | Descriptor |
|---|---|
| ... | |
|   ph_inter_slice_allowed_flag | u(1) |
| ... | |
|   if( ph_inter_slice_allowed_flag ) { | |
| | |
|     if( rpl_info_in_ph_flag ) { | |
|       ph_num_ref_idx_active_override_flag | u(1) |
|       if( ph_num_ref_idx_active_override_flag ) | |
|         for( i = 0; i < 2; i++ ) | |
|           if( num_ref_entries_minus1[ i ][ RplsIdx[ i ] ] > 0 ) | |
|             ph_num_ref_idx_active_minus1[ i ] | ue(v) |
|       } | |
|     if( sps_temporal_mvp_enabled_flag ) { | |
|       ph_temporal_mvp_enabled_flag | u(1) |
|       if( ph_temporal_mvp_enabled_flag && rpl_info_in_ph_flag ) { | |
|         ph_collocated_from_l0_flag | u(1) |
|         if( ( ph_collocated_from_l0_flag && NumRefIdxActive[ 0 ] > 1 ) \|\| | |
|           ( !ph_collocated_from_l0_flag && NumRefIdxActive[ 1 ] > 1 ) ) | |
|         ph_collocated_ref_idx | ue(v) |
|       } | |
|     } | |
| | |
|     if( ( pps_weighted_pred_flag \|\| pps_weighted_bipred_flag ) && wp_info_in_ph_flag ) | |
|       pred_weight_table( ) | |
|   } | |
| ... | |
| } | |

FIG. 24B

```
for( i = 0; i < 2; i++ ) {
  if( ph_num_ref_idx_active_override_flag )
    NumRefIdxActive[ i ] = ( num_ref_entries_minus1[ i ][ RplsIdx[ i ] ] > 0 )?
                            ph_num_ref_idx_active_minus1[ i ] + 1 : 1
  else {
    if( num_ref_entries_minus1[ i ][ RplsIdx[ i ] ] >= num_ref_idx_default_active_minus1[ i ] )
      NumRefIdxActive[ i ] = num_ref_idx_default_active_minus1[ i ] + 1
    else
      NumRefIdxActive[ i ] = num_ref_entries_minus1[ i ][ RplsIdx[ i ] ] + 1
  }
}
```

FIG. 25A

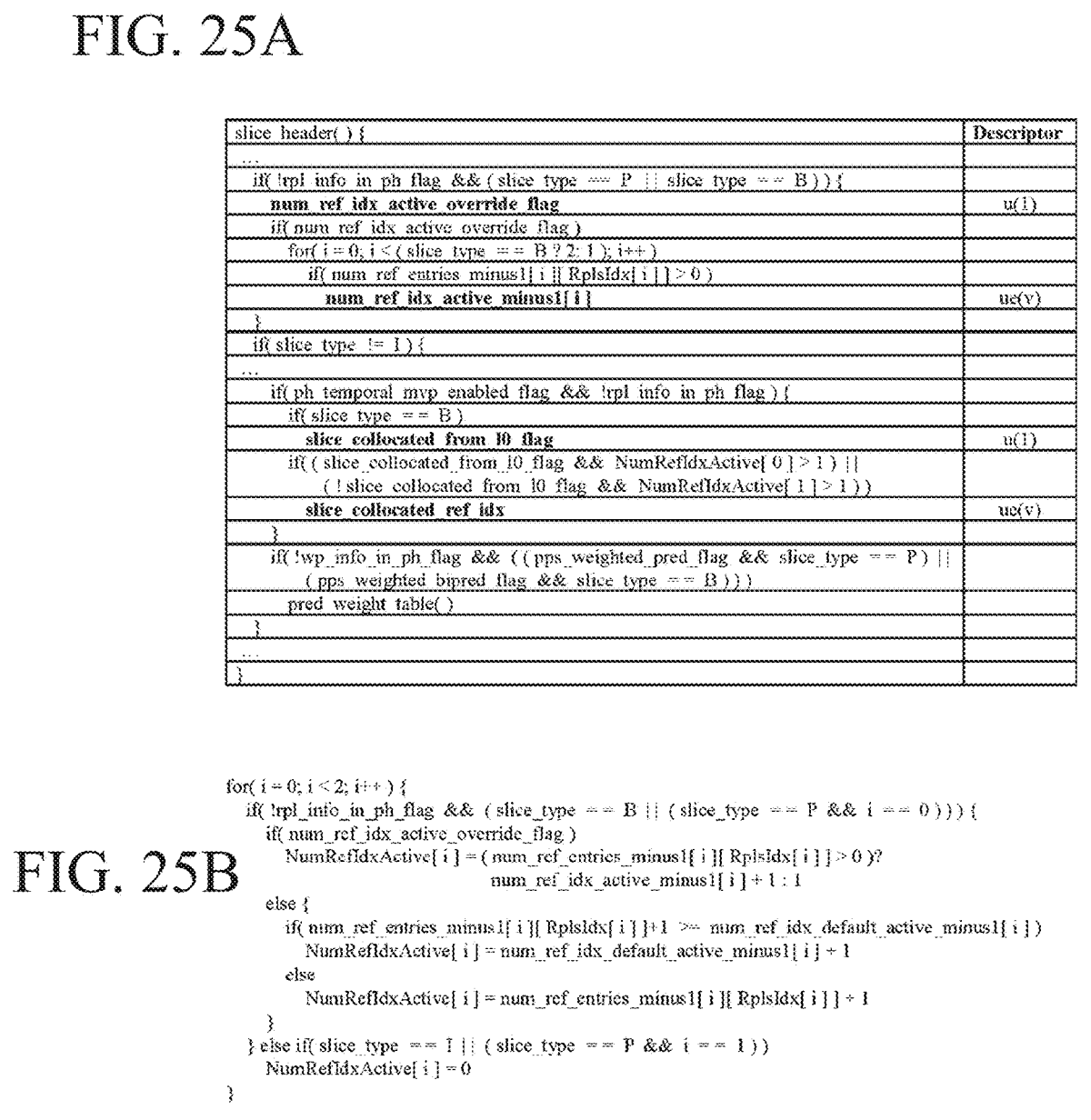

| slice_header( ) { | Descriptor |
|---|---|
| ... | |
| if( !rpl_info_in_ph_flag && ( slice_type == P \|\| slice_type == B ) ) { | |
|    num_ref_idx_active_override_flag | u(1) |
|    if( num_ref_idx_active_override_flag ) | |
|      for( i = 0; i < ( slice_type == B ? 2: 1 ); i++ ) | |
|        if( num_ref_entries_minus1[ i ][ RplsIdx[ i ] ] > 0 ) | |
|          num_ref_idx_active_minus1[ i ] | ue(v) |
|    } | |
| if( slice_type != I ) { | |
| ... | |
|    if( ph_temporal_mvp_enabled_flag && !rpl_info_in_ph_flag ) { | |
|      if( slice_type == B ) | |
|        slice_collocated_from_l0_flag | u(1) |
|      if( ( slice_collocated_from_l0_flag && NumRefIdxActive[ 0 ] > 1 ) \|\| | |
|        ( !slice_collocated_from_l0_flag && NumRefIdxActive[ 1 ] > 1 ) ) | |
|        slice_collocated_ref_idx | ue(v) |
|    } | |
|    if( !wp_info_in_ph_flag && ( ( pps_weighted_pred_flag && slice_type == P ) \|\| | |
|      ( pps_weighted_bipred_flag && slice_type == B ) ) ) | |
|      pred_weight_table( ) | |
|    } | |
| ... | |
| } | |

FIG. 25B

```
for( i = 0; i < 2; i++ ) {
    if( !rpl_info_in_ph_flag && ( slice_type == B || ( slice_type == P && i == 0 ) ) ) {
        if( num_ref_idx_active_override_flag )
            NumRefIdxActive[ i ] = ( num_ref_entries_minus1[ i ][ RplsIdx[ i ] ] > 0 )?
                                     num_ref_idx_active_minus1[ i ] + 1 : 1
        else {
            if( num_ref_entries_minus1[ i ][ RplsIdx[ i ] ]+1 >= num_ref_idx_default_active_minus1[ i ] )
                NumRefIdxActive[ i ] = num_ref_idx_default_active_minus1[ i ] + 1
            else
                NumRefIdxActive[ i ] = num_ref_entries_minus1[ i ][ RplsIdx[ i ] ] + 1
        }
    } else if( slice_type == I || ( slice_type == P && i == 1 ) )
        NumRefIdxActive[ i ] = 0
}
```

| pred_weight_table( ) { | Descriptor |
|---|---|
|   luma_log2_weight_denom | ue(v) |
|   if( ChromaArrayType != 0 ) | |
|     delta_chroma_log2_weight_denom | se(v) |
|   for( i = 0; i < NumRefIdxActive[ 0 ]; i++ ) | |
|     luma_weight_l0_flag[ i ] | u(1) |
|   if( ChromaArrayType != 0 ) | |
|     for( i = 0; i < NumRefIdxActive[ 0 ]; i++ ) | |
|       chroma_weight_l0_flag[ i ] | u(1) |
|   for( i = 0; i < NumRefIdxActive[ 0 ]; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( pps_weighted_bipred_flag ) { | |
|     for( i = 0; i < NumRefIdxActive[ 1 ]; i++ ) | |
|       luma_weight_l1_flag[ i ] | u(1) |
|     if( ChromaArrayType != 0 ) | |
|       for( i = 0; i < NumRefIdxActive[ 1 ]; i++ ) | |
|         chroma_weight_l1_flag[ i ] | u(1) |
|     for( i = 0; i < NumRefIdxActive[ 1 ]; i++ ) { | |
|       if( luma_weight_l1_flag[ i ] ) { | |
|         delta_luma_weight_l1[ i ] | se(v) |
|         luma_offset_l1[ i ] | se(v) |
|       } | |
|       if( chroma_weight_l1_flag[ i ] ) | |
|         for( j = 0; j < 2; j++ ) { | |
|           delta_chroma_weight_l1[ i ][ j ] | se(v) |
|           delta_chroma_offset_l1[ i ][ j ] | se(v) |
|         } | |
|     } | |
|   } | |
| } | |

FIG. 26

CODING APPARATUS, DECODING APPARATUS AND COMPUTER-READABLE RECORDING MEDIUM FOR ENCODING/DECODING VIDEO DATA USING SYNTAX ELEMENTS AND WEIGHT COEFFICIENTS

CROSS-REFERENCE TO RELATED APPLICATIONS

The present application is a continuation application of U.S. patent application Ser. No. 18/207,703, filed on Jun. 9, 2023, which is a continuation application of U.S. patent application Ser. No. 17/681,615, filed on Feb. 25, 2022, which is a continuation application of U.S. patent application Ser. No. 17/201,627, filed on Mar. 15, 2021, which claims the benefit of priority to Japanese Patent Application Number 2020-046124 filed on Mar. 17, 2020. The entire contents of the above-identified application are hereby incorporated by reference.

BACKGROUND

Technical Field

The embodiments of the present disclosure relate to a prediction image generation apparatus, a video decoding apparatus, and a video coding apparatus.

A video coding apparatus which generates coded data by coding a video, and a video decoding apparatus which generates decoded images by decoding the coded data are used for efficient transmission or recording of videos.

Examples of specific video coding schemes include H.264/AVC, H.265/AVC, High-Efficiency Video Coding (HEVC).

In such a video coding scheme, images (pictures) constituting a video are managed in a hierarchical structure including slices obtained by splitting an image, coding tree units (CTUs) obtained by splitting a slice, units of coding (coding units; which will be referred to as CUs) obtained by splitting a coding tree unit, and transform units (TUs) which are blocks obtained by splitting a coding unit, and are coded/decoded for each CU.

Additionally, in such a video coding scheme, usually, a prediction image is generated based on a local decoded image that is obtained by coding/decoding an input image (a source image), and prediction residual (which may be referred to also as "difference images" or "residual images") obtained by subtracting the prediction image from the input image are coded. Generation methods of prediction images include an inter-picture prediction (an inter prediction) and an intra-picture prediction (intra prediction).

In addition, as a technology for recent video coding and decoding, "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12 is provided.

In "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12, in managing a reference picture list for inter prediction, a scheme is adopted in which multiple reference picture lists are defined and used for reference. Additionally, for weighted prediction, an approach to defining the number of weights explicitly is adopted.

SUMMARY

However, in "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12, in managing the reference picture list, a reference picture list structure with zero reference pictures can be defined, and thus there is problem in that the reference picture is indefinite.

In addition, in the defined reference picture list structures, there is a problem in that the number of reference pictures actually used for prediction can be defined in a slice header but fails to be defined in a picture header.

Additionally, in the weighted prediction, although the number of weights is explicitly defined, the number of reference pictures that can be used is already known. Thus, there is a problem in that this definition is a redundant description.

A video decoding apparatus according to an aspect of the present disclosure includes an inter prediction unit configured to decode multiple reference picture list structures and to select one reference picture list structure from the multiple reference picture list structures on a per picture basis or on a per slice basis, wherein in the multiple reference picture list structures, the number of all reference pictures is one or more.

Such a configuration prevents the reference picture from being indefinite.

A video decoding apparatus according to an aspect of the present disclosure is configured to: decode, in a case that a single reference picture list structure is selected from multiple reference picture list structures on a per picture basis, a flag indicating whether to rewrite, on a per picture basis, the number of reference pictures actually used for prediction; decode, in a case that the flag is true, a value of the number of reference pictures actually used for prediction minus 1 and configure the number of reference pictures actually used for prediction; and compare, in a case that the flag is false and that the number of reference pictures actually used for prediction is not rewritten, the number of pictures in the reference picture list structure with a default number of reference pictures actually used for prediction and determine a smaller value to be the number of reference pictures actually used.

Such a configuration allows the number of reference pictures actually used to be defined even in a picture header.

A video decoding apparatus according to an aspect of the present disclosure is configured to: decode a flag in a case that a single reference picture list structure is selected from multiple reference picture list structures on a per slice basis and a case of B slices or P slices and reference picture list 0, a flag indicating whether to rewrite, on a per slice basis, the number of reference pictures actually used for prediction; decode, in a case that the flag is true, a value of the number of reference pictures actually used for prediction minus 1 and configure the number of reference pictures actually used for prediction; compare, in a case that the flag is false and that the number of reference pictures actually used for prediction is not rewritten, the number of pictures in the reference picture list structure with a default number of reference pictures actually used for prediction and to determine a smaller value as the number of reference pictures actually used; and determine the number of reference pictures to be zero in a case of I slices or P slices and reference picture list 1.

Such a configuration allows the number of reference pictures actually used for prediction to be correctly defined in a slice header.

A video decoding apparatus according to an aspect of the present disclosure is configured to: determine, in a case that a single reference picture list structure is selected from multiple reference picture list structures on a per picture basis, the number of reference pictures actually used for prediction on a per picture basis and decode weighted prediction information based on the number of reference pictures determined on a per picture basis; and determine, in a case that a single reference picture list structure is selected from multiple reference picture list structures on a per slice basis, the number of reference pictures actually used for prediction on a per slice basis and decode weighted prediction information based on the number of reference pictures determined on a per slice basis.

Such a configuration can correct the redundancy of the number of weights.

According to an aspect of the present disclosure, the above-described problems can be solved.

BRIEF DESCRIPTION OF DRAWINGS

FIGS. 15A and 15B are diagrams illustrating a portion of a syntax for a Sequence Parameter Set (SPS) and a Picture Parameter Set (PPS).

FIG. 16 is a diagram illustrating a portion of a syntax for a picture header PH.

FIGS. 17A and 17B illustrate a portion of a syntax for a slice header.

FIG. 18 is a diagram illustrating a syntax for weighted prediction information pred_weight_table.

FIGS. 19A and 19B are diagrams illustrating a syntax defining a ref_pic_lists ( ) defining a reference picture list and a reference picture list structure ref_pic_list_struct(listIdx, rplsIdx).

FIG. 20 is a diagram illustrating a syntax defining a reference picture list structure ref_pic_list_struct(listIdx, rplsIdx) according to the present embodiment.

FIGS. 21A and 21B are diagrams illustrating a syntax for the picture header pH and the slice header according to the present embodiment.

FIG. 22 is a diagram illustrating a syntax for the weighted prediction information pred_weight_table according to the present embodiment.

FIG. 23 is a diagram illustrating a syntax for another weighted prediction information pred_weight_table according to the present embodiment.

FIGS. 24A and 24B are diagrams illustrating a syntax for the picture header and a method for deriving a variable NumRefIdxActive[i] in the present embodiment.

FIGS. 25A and 25B are diagrams illustrating a syntax for the slice header and a method for deriving a variable NumRefIdxActive[i] in the present embodiment.

FIG. 26 is a diagram illustrating a syntax for another weighted prediction information pred_weight_table according to the present embodiment.

DESCRIPTION OF EMBODIMENTS

First Embodiment

Hereinafter, embodiments of the present disclosure will be described with reference to the drawings.

Figure 1:
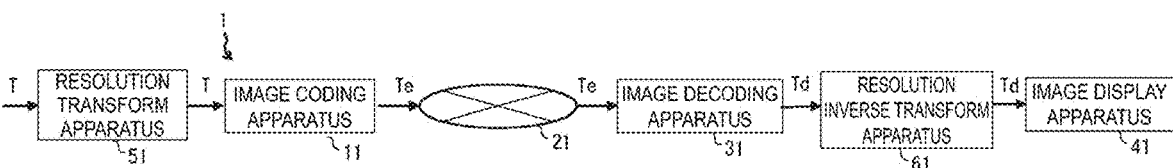
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system transmitting a coding stream obtained by coding images with a different resolution resulting from transformation of the resolution and decoding the transmitted coding stream to inversely transform the image into the original resolution for display. The image transmission system 1 includes a resolution transform apparatus (resolution transform unit) 51, a video coding apparatus (image coding apparatus) 11, a network 21, a video decoding apparatus (image decoding apparatus) 31, a resolution inverse transform apparatus (resolution inverse transform unit) 61, and a video display apparatus (image display apparatus) 41.

The resolution transform apparatus 51 transforms the resolution of an image T included in a video, and supplies a variable resolution video signal including the images with the different resolution to the video coding apparatus 11. The resolution transform apparatus 51 supplies the video coding apparatus 11 with information indicating the presence or absence of resolution transform for the image. In a case that the information indicates resolution transform, the video coding apparatus sets resolution transform information ref_pic_resampling_enabled_flag described below to 1, and includes the information in a sequence parameter set SPS (SequenceParameter Set) of coded data for coding.

The image T with the transformed resolution is input into the video coding apparatus 11.

The network 21 transmits a coding stream Te generated by the video coding apparatus 11 to the video decoding apparatus 31. The network 21 is the Internet, a Wide Area Network (WAN), a small network (Local Area Network (LAN)), or a combination thereof. The network 21 is not necessarily limited to a bidirectional communication network, and may be a unidirectional communication network configured to transmit broadcast waves of digital terrestrial television broadcasting, satellite broadcasting of the like. Additionally, the network 21 may be substituted with a storage medium in which the coding streams Te are recorded, such as a Digital Versatile Disc (DVD, trade name) or a Blue-ray Disc (BD, trade name).

The video decoding apparatus 31 decodes each of the coding streams Te transmitted by the network 21, generates a variable resolution decoded image signal, and supplies the resultant signal to the resolution inverse transform apparatus 61.

The resolution inverse transform apparatus 61 generates a decoded image signal with the original size by inversely transforming the resolution transformed image in a case that the resolution transform information included in the variable resolution decoded image signal indicates resolution transform.

The video display apparatus 41 displays all or part of the one or multiple decoded images Td indicated by decoded image signal input from the resolution inverse transform unit. For example, the video display apparatus 41 includes a display device such as a liquid crystal display and an organic Electro-Luminescence (EL) display. Forms of the display include stationary, mobile, HMD, and the like. In addition, in a case that the video decoding apparatus 31 has a high processing capability, images having high image quality are displayed, and in a case that the video decoding apparatus 31 have only a lower processing capability, images are displayed which do not require a high a processing capability or display capability.

Operator

Operators used in the present specification will be described below.

>> is a right bit shift, << is a left bit shift, & is a bitwise AND, | is a bitwise OR, |= is an OR assignment operator, and || indicates a logical sum.

x?y:z is a ternary operator to take y in a case that x is true (other than 0) and take z in a case that x is false (0).

Clip3 (a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs (a) is a function that returns the absolute value of a.

Int (a) is a function that returns an integer value of a.

floor (a) is a function that returns a maximum integer equal to or less than a.

ceil (a) is a function that returns a minimum integer greater than or equal to a.

a/d represents the division of a by d (decimals are omitted).

min (a, b) represents the smaller of a and b.

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
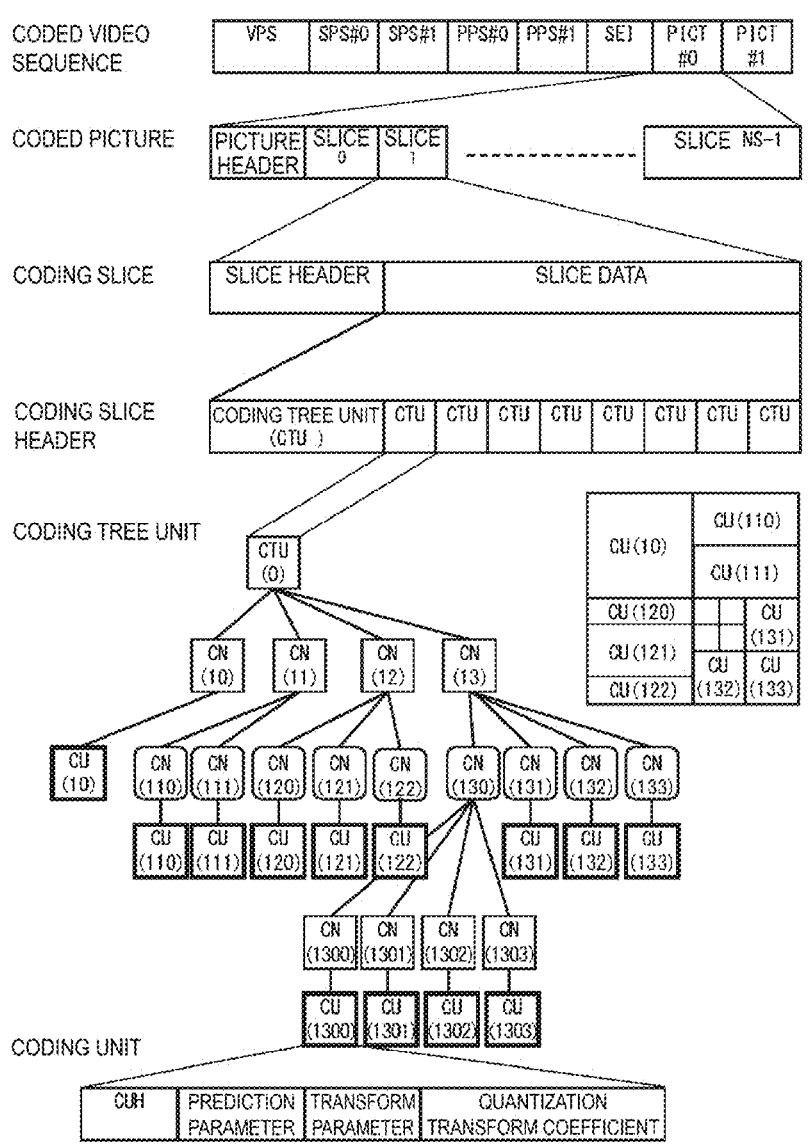
FIG. 4 is a diagram illustrating a hierarchical structure of data of a coding stream.

FIG. 4 is a diagram illustrating a hierarchical structure of data in the coding stream Te. The coding stream Te includes a sequence and multiple pictures constituting the sequence illustratively. FIG. 4 illustrates a coded video sequence defining a sequence SEQ, a coded picture prescribing a picture PICT, a coding slice prescribing a slice S, a coding slice data prescribing slice data, a coding tree unit included in the coding slice data, and a coding unit included in each coding tree unit.

Coding Video Sequence

For the coded video sequence, a set of data is specified that is referenced by the video decoding apparatus 31 to decode the sequence SEQ to be processed. As illustrated in FIG. 4, the sequence SEQ includes a Video Parameter Set VPS, a Sequence Parameter Set SPS, a Picture Parameter Set PPS, Adaptation Parameter Set (APS), a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters is specified that is referenced by the video decoding apparatus 31 to decode a target sequence. For example, a width and a height of a picture are defined. Note that multiple SPSs may exist. In that case, any of multiple SPSs is selected from the PPS.

Here, the sequence parameter set SPS includes the following syntax.

ref_pic_resampling_enabled_flag: a flag specifying whether to use a function to make resolution variable (resampling) in a case that each image included in a single sequence referencing the target SPS is decoded. In another aspect, the flag indicates that the size of the reference picture referenced in the generation of a prediction image changes between images indicated by the single sequence. The resampling is applied in a case that the value of the flag is 1, and is not applied in a case that the value of the flag is 0.

pic_width_max_in_luma samples: a syntax indicating in luminance block units, the width of an image included in a single sequence and having the largest width. Furthermore, the value of the syntax is not 0, and is required to be an integer multiple of Max (8, MinCbSizeY). Here, MinCbSizeY is a value determined by the minimum size of the luminance block.

pic_height_max_in_luma_samples: a syntax indicating in luminance block units, the height of an image included in a single sequence and having the largest height. Furthermore, the value of the syntax is not 0, and is required to be an integer multiple of Max (8, MinCbSizeY).

sps_temporal_mvp_enabled_flag: a flag specifying whether to use temporal motion vector prediction in a case that the target sequence is decoded. The temporal motion vector prediction is used in a case that the value of the flag is 1, and not used in a case that the value is 0. In addition, with the flag specified, in a case that, for example, reference pictures with different resolutions are referenced, referenced coordinate positions can be prevented from being displaced.

For the picture parameter set PPS, a set of coding parameters is specified that is referenced by the video decoding apparatus 31 to decode each picture in the target sequence. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Here, the picture parameter set PPS includes the following syntax.

pic_width_in_luma_samples: a syntax indicating the width of a target picture. The value of the syntax is not 0, but is an integer multiple of Max (8, MinCbSizeY), and is required to be a value equal to or less than the value of the pic_width_max_in_luma_samples.

pic_height_in_luma_samples: a syntax indicating the height of the target picture. The value of the syntax is not 0, but is an integer multiple of Max (8, MinCb-SizeY), and is required to be a value equal to or less than the value of the pic_height_max_in_luma_samples.

conformance_window_flag: a flag indicating whether a conformance (cropping) window offset parameter is subsequently notified, and indicating a location where a conformance window is displayed. The parameter is notified in a case that the flag is 1, and the flag of 0 indicates the absence of the conformance window offset parameter.

conf_win_left_offset, conf_win_right_offset, conf_win_top_offset, conf_win_bottom_offset: offset values indicating, for a rectangular region indicated by picture coordinates for output, the left, right, top, and bottom positions of a picture output in decoding processing. In a case that the value of the conformance_window_flag is 0, the values of conf_win_left_offset, conf_win_right_offset, conf_win_top_offset, and conf_win_bottom_offset are inferred to be 0.

scaling_window_flag: a flag indicating whether a scaling window offset parameter is present in a target PPS, the flag being related to the specification of the image size to be output. The flag of 1 indicates that the parameter is present in the PPS, and the flag of 0 indicates that the parameter is not present in the PPS. Additionally, in a case that the value of ref_pic_resampling_enabled_flag is 0, the value of the scaling_window_flag is also required to be 0.

scaling_win_left_offset, scaling_win_right_offset, scaling_win_top_offset, scaling_win_bottom_offset: syntaxes indicating, in luminance sample units, an offset applied to the image size for calculation of a scaling ratio, for the left, right, top, and bottom positions of the target picture, respectively. Additionally, in a case that the value of scaling_window_flag is 0, the values of scaling_win_left_offset, scaling_win_right_offset, scaling_win_top_offset, and scaling_win_bottom_offset are inferred to be 0. Additionally, the value of scaling_win_left_offset+scaling_win_right_offset is required to be smaller than the pic_width_in_luma_samples, and the values of scaling_win_top_offset+scaling_win_bottom_offset is required to be smaller than the pic_height_in_luma_samples.

The width PicOutputWidthL and height PicOutputHeightL of the output picture are derived as follows.

$$\text{PicOutputWidthL} = \text{pic\_width\_in\_luma\_samples} - (\text{scaling\_win\_right\_offset} + \text{scaling\_win\_left\_offset})$$

$$\text{PicOutputHeightL} = \text{pic\_height\_in\_pic\_size\_units} - (\text{scaling\_win\_bottom\_offset} + \text{scaling\_win\_top\_offset})$$

pps_collocated_from_l0_idc: a syntax indicating whether a collocated_from_l0_flag is present in the slice header of a slice that references the PPS. The value of the syntax being 0 indicates that the collocated_from_l0_flag is present in the slice header and, the value of the syntax being 1 or 2 indicates that the collocated_from_l0_flag is not present in the slice header.

Coded Picture

For the coded picture, a set of data is specified that is referenced by the video decoding apparatus 31 to decode the picture PICT to be processed. As illustrated in FIG. 4, the picture PICT includes the picture header PH and slices 0 to NS−1 (NS is the total number of slices included in the picture PICT).

Note that in a case that the slices 0 to NS−1 need not be distinguished from one another below, subscripts of reference signs may be omitted. In addition, the same applies to other data with subscripts included in the coding stream Te which will be described below.

The picture header includes the following syntax:

pic_temporal_mvp_enabled_flag: a flag specifying whether a temporal motion vector prediction is used for inter prediction of a slice associated with the picture header. In a case that the value of the flag is 0, a syntax element of the slice associated with the picture header is restricted to prevent the temporal motion vector prediction from being used in the decoding of the slice. The value of the flag being 1 indicates that temporal motion vector prediction is used to decode the slice associated with the picture header. In a case that the flag is not specified, the value is inferred to be 0.

Coding Slice

For the coding slice, a set of data is specified that is referenced by the video decoding apparatus 31 to decode the slice S to be processed. As illustrated in FIG. 4, the slice includes a slice header and a slice data.

The slice header includes a coding parameter group referenced by the video decoding apparatus 31 to determine a decoding method for a target slice. Slice type specification information (slice_type) indicating a slice type is one example of a coding parameter included in the slice header.

Examples of slice types that can be specified by the slice type specification information include (1) I slice using only an intra prediction in coding, (2) P slice using a uni-prediction or an intra prediction in coding (L0 prediction), and (3) B slice using a uni-prediction (L0 prediction using only the reference picture list 0 or L1 prediction using only the reference picture list 1), a bi-prediction, or an intra prediction in coding, and the like. Note that the inter prediction is not limited to the uni-prediction or the bi-prediction, and a greater number of reference pictures may be used to generate the prediction image. In a case that the P or B slice is hereinafter referred to, this refers to a slice that includes a block that may employ the inter prediction.

Note that the slice header may include a reference to the picture parameter set PPS (pic_parameter_set_id).

Coding Slice Data

For the coding slice data, a set of data is specified that is referenced by the video decoding apparatus 31 to decode the slice data to be processed. The slice data includes a CTU, as illustrated in a coding slice header in FIG. 4. A CTU is a block of a fixed size (for example, 64×64) constituting a slice, and may be called a Largest Coding Unit (LCU).

Coding Tree Unit

In FIG. 4, a set of data is specified that is referenced by the video decoding apparatus 31 to decode a CTU to be processed. The CTU is divided into coding units CU corresponding to basic units for coding processing, by recursive quad-tree split (QT (Quad Tree) split), binary tree split (BT (Binary Tree) split) or ternary tree split (TT (Ternary Tree) split). The BT split and the TT split are collectively referred to as multi-tree split (MMT (Multi Tree) split). Nodes of a tree structure obtained by recursive quad tree split are referred to as coding nodes. Intermediate nodes of a quad tree, a binary tree, and a ternary tree are coding nodes, and the CTU itself is also specified as a highest coding node.

CT includes, as CT information, a CU split flag (split_cu_flag) indicating whether to perform CT split, a QT split flag (qt_split_cu_flag) indicating whether to perform the QT split; MT split direction (mtt_split_cu_vertical_flag) indicating the direction of the MT split, MT split type (mtt_split_cu_binary_flag), which indicates the split type of the MT split. The split_cu_flag, qt_split_cu_flag, mtt_split_cu_vertical_flag, and mtt_split_cu_binary_flag are transmitted for each coding node.

Different trees may be used for luminance and for chroma. The type of tree is indicated by treeType. For example, in a case that a common tree is used for the luminance (Y, cIdx=0) and the chroma (Cb/Cr, cIdx=1,2), a common single tree is represented as treeType=SINGLE_TREE. In a case that two different trees (DUAL tree) are used for the luminance and for the chroma, the luminance tree is indicated by treeType=DUAL_TREE_LUMA, and the chroma tree is indicated by treeType=DUAL_TREE_CHROMA.

Coding Unit

In FIG. 4, a set of data is specified that is referenced by the video decoding apparatus 31 to decode the coding unit to be processed. Specifically, the CU includes a CU header CUH, a prediction parameter, a transform parameter, a quantization transform coefficient, and the like. In the CU header, a prediction mode and the like are specified.

The prediction processing may be performed in CU units or in sub-CU units into which the CU is further split. In a case that the CU is equal in size to the sub-CU, one sub-CU is present in the CU. In a case that the CU is larger in size than the sub-CU, the CU is divided into sub-CUs. For example, in a case that the CU is 8×8 and the sub-CU is 4×4 in size, the CU is split into four sub-CUs which include two horizontal splits and two vertical splits.

There are two types of prediction (prediction modes): intra prediction and inter prediction. The intra prediction refers to a prediction in an identical picture, and the inter prediction refers to prediction processing performed between different pictures (for example, between pictures of different display times, and between pictures of different layer images).

Transform and quantization processing is performed in CU units, but a quantization transform coefficient may be entropy coded in sub-block units such as 4×4.

Prediction Parameter

The prediction image is derived by a prediction parameter associated with a block. The prediction parameter includes a prediction parameter of an intra prediction or a prediction parameter of an inter prediction.

The prediction parameter of an inter prediction will be described below. The inter prediction parameter includes prediction list utilization flags predFlagL0 and predFlagL1, reference picture indexes refIdxL0 and refIdxL1, and motion vectors mvL0 and mvL1. flags predFlagL0 and predFlagL1 are flags to indicate whether reference picture lists (L0 list and L1 list) respectively are used, and a corresponding reference picture list is used in a case that the value is 1. Note that, in a case that the present specification mentions "a flag indicating whether XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied).

However, other values can be used for true values and false values in real apparatuses and methods.

For example, syntax elements to derive inter prediction parameters include an affine flag affine_flag, a merge flag merge_flag, a merge index merge_idx, and a MMVD flag mmvd_flag that are used in a merge mode, and an inter prediction indicator inter_pred_idc for selecting a reference picture, a reference picture index refIdxLX, a prediction vector index mvp_LX_idx for deriving a motion vector, a difference vector mvdLX, and a motion vector accuracy mode amvr_mode that are used in an AMVP mode.

Reference Picture List

Figure 5:
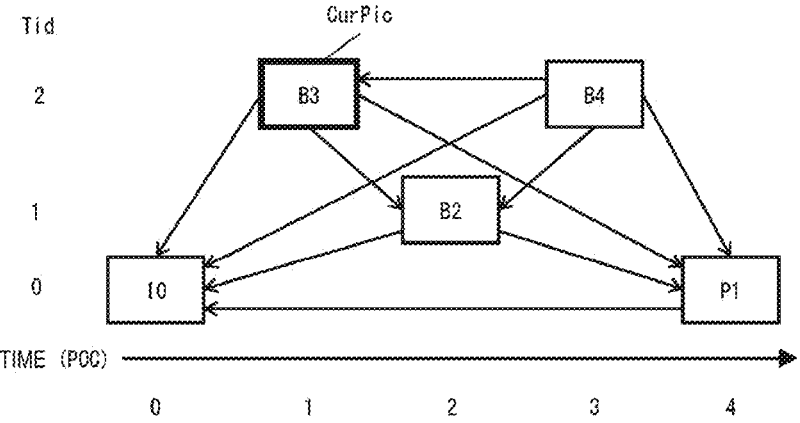
FIG. 5 is a conceptual diagram illustrating an example of reference pictures and reference picture lists.
Figure 5:
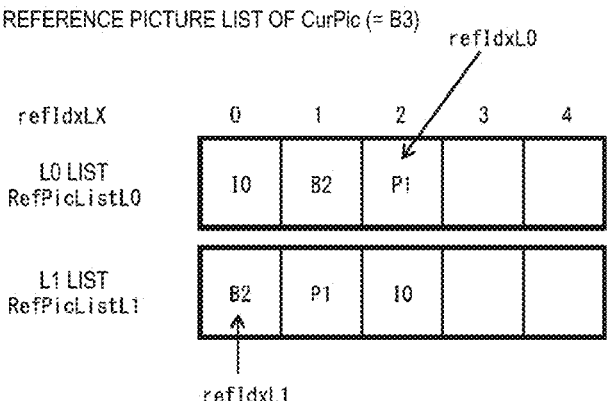

A reference picture list is a list constituted by reference pictures stored in a reference picture memory 306. FIG. 5 is a conceptual diagram illustrating an example of reference pictures and reference picture lists. In the conceptual diagram in FIG. 5 illustrating an example of reference pictures, a rectangle indicates a picture, an arrow indicates a reference relationship of a picture, a horizontal axis indicates time, I, P, and B in a rectangle respectively indicate an intra-picture, a uni-prediction picture, a bi-prediction picture, and a number in a rectangle indicates a decoding order. As illustrated, the decoding order of the pictures is I0, P1, B2, B3, and B4, and the display order is I0, B3, B2, B4, and P1. FIG. 5 illustrates an example of a reference picture list of a picture B3 (target picture). The reference picture list is a list to represent a candidate of a reference picture, and one picture (slice) may include one or more reference picture lists. In the illustrated example, a target picture B3 includes two reference picture ists, i.e., a L0 list RefPicList0 and a L1 list RefPicList1. In individual CUs, refIdxLX is used to indicate which picture in a reference picture list RefPicListX (X=0 or 1) is actually referenced. The figure is an example of refIdxL0=2 and refIdxL1=0. Note that LX is a description method used in a case of not distinguishing an L0 prediction and an L1 prediction, and hereinafter distinguishes parameters for the L0 list and parameters for the L1 list by replacing LX with L0 and L1.

Merge Prediction and AMVP Prediction

Decoding (coding) methods of prediction parameters include a merge prediction (merge) mode and an Advanced Motion Vector Prediction (AMVP) mode, and merge_flag is a flag to identify these. The merge prediction mode is a mode to derive the prediction list utilization flag predFlagLX, the reference picture index refIdxLX, and the motion vector mvLX from, for example, prediction parameters of neighboring blocks already processed without including the prediction list utilization flag predFlagLX, the reference picture index refIdxLX, and the motion vector mvLX in coded data. The AMVP mode is a mode to include inter_pred_idc, refIdxLX, and mvLX in the coded data. Note that, mvLX is coded as mvp_LX_idx identifying a prediction vector mvpLX and a difference vector mvdLX. In addition to the merge prediction mode, an affine prediction mode and an MMVD prediction mode may be provided.

inter_pred_idc is a value indicating the types and the number of reference pictures, and takes any value of PRED_L0, PRED_L1, and PRED_BI. PRED_L0 and PRED_L1 respectively indicate uni-predictions using one reference picture managed in the L0 list and the L1 list. PRED_BI indicates a bi-prediction using two reference pictures managed in the L0 list and the L1 list.

merge_idx is an index to indicate which of prediction parameter candidates (merge candidates) derived from blocks for which the processing is completed is used as a prediction parameter for a target block.

Motion Vector mvLX indicates the amount of shift between blocks in two different pictures. A prediction vector and a difference vector related to mvLX is referred to as mvpLX and mvdLX respectively.

Inter Prediction Indicator inter_pred_idc and Prediction List Utilization Flag predFlagLX Relationships between inter_pred_idc, and predFlagL0 and predFlagL1 are as follows, and those can be transformed mutually.

$$inter\_pred\_idc = (predFlagL1 << 1) + predFlagL0$$

$$predFlagL0 = inter\_pred\_idc \ \& \ 1$$

$$predFlagL1 = inter\_pred\_idc >> 1$$

Note that an inter prediction parameter may use a prediction list utilization flag or may use an inter prediction indicator. A determination using a prediction list utilization flag may be replaced with a determination using an inter prediction indicator. On the contrary, a determination using an inter prediction indicator may be replaced with a determination using a prediction list utilization flag.

Determination of Bi-Prediction biPred

A flag biPred indicating whether the prediction is a bi-prediction can be derived from whether two prediction list utilization flags are both 1. For example, the flag can be derived by the following equation.

$$biPred = (predFlagL0 == 1 \ \&\& \ predFlagL1 == 1)$$

Alternatively, biPred can be derived based on whether an inter prediction indicator has a value indicating whether the use of two prediction lists (reference pictures). For example, the flag can be derived by the following equation.

$$biPred = inter\_pred\_idc == PRED\_BI \ ? \ 1: \ 0$$

Configuration of Video Decoding Apparatus

Figure 6:
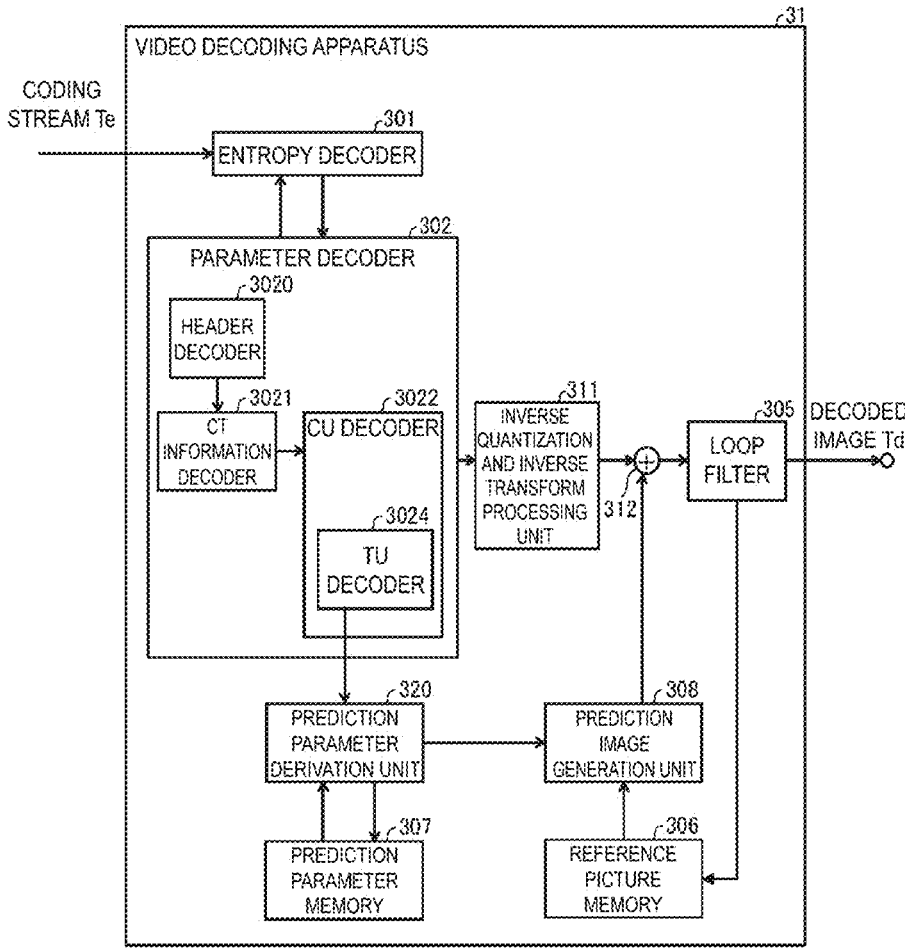
FIG. 6 is a schematic diagram illustrating a configuration of a video decoding apparatus according to the present embodiment.

A configuration of the video decoding apparatus 31 according to the present embodiment (FIG. 6) will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that, in a certain configuration, the loop filter 305 is not included in the video decoding apparatus 31 in accordance with the video coding apparatus 11 described below.

The parameter decoder 302 further includes a header decoder 3020, a CT information decoder 3021, and a CU decoder 3022 (prediction mode decoder). the CU decoder 3022 further includes a TU decoder 3024. These may be collectively referred to as decoding modules. The header decoder 3020 decodes parameter set information such as VPS, SPS, PPS, and APS and the slice header (slice information) from the coded data. The CT information decoder 3021 decodes CTs from the coded data. The CU decoder 3022 decodes CUs from the coded data. In a case that the TU includes a prediction residual, the TU decoder 3024 decodes QP update information (quantization correction value) and a quantization prediction residual (residual coding) from the coded data.

The TU decoder 3024 decodes the QP update information and the quantization prediction residual from the coded data in a case other than the skip mode (skip_mode==0). More specifically, the TU decoder 3024 decodes the flag cu_cbp indicating whether a quantization prediction residual is included in the target block in the case of skip_mode==0, and decodes the quantization prediction residual in a case that cu_cbp is 1. In a case that cu_cbp is not present in the coded data, the value is derived as 0.

The TU decoder 3024 decodes, from the coded data, an index mts_idx indicating a transform basis. The TU decoder 3024 decodes, from the coded data, an index stIdx indicating the use of a secondary transform and the transform basis. stIdx of 0 indicates non-application of the secondary transform, stIdx of 1 indicates transform of one of a set (pairs) of secondary transform bases, and stIdx of 2 indicates transform of the other of the pair.

The TU decoder 3024 may decode a sub-block transform flag cu_sbt_flag. In a case that cu_sbt_flag is 1, the CU is split into multiple sub-blocks and residuals are decoded only for one particular sub-block. Furthermore, the TU decoder 3024 may decode a flag cu_sbt_quad_flag indicating whether the number of sub-blocks is 4 or 2, cu_sbt_horizontal_flag indicating a splitting direction, and cu_sbt_pos_flag indicating a sub-block including a non-zero transform coefficient.

The prediction image generation unit 308 includes an inter prediction image generation unit 309 and an intra prediction image generation unit 310.

The prediction parameter derivation unit 320 includes an inter prediction parameter derivation unit 303 and an intra prediction parameter derivation unit 304.

An example in which CTUs and CUs are used as units of processing is described below, but the present disclosure is not limited to this example, and processing may be performed in sub-CU units. Alternatively, the CTUs and CUs may be replaced with blocks, the sub-CUs may be replaced with sub-blocks, and processing may be executed in block units or sub-block units.

The entropy decoder 301 performs entropy decoding on the coding stream Te input from the outside and decodes individual codes (syntax elements). Entropy coding includes a method for variable-length coding of syntax elements using a context (probability model) adaptively selected depending on the type of syntax elements or the surrounding situation, and a method for variable-length coding of the syntax elements using a predetermined table or calculation formula. The former CABAC (Context Adaptive Binary Arithmetic Coding) stores in memory the CABAC state of the context (the type of a dominant symbol (0 or 1) and a probability state index pStateIdx indicating the probability). The entropy decoder 301 initializes all CABAC states at the beginning of the segment (tile, CTU row, slice). The entropy decoder 301 transforms the syntax element into a binary string (Bin String) and decodes each bit of the Bin String. In a case that the context is used, a context index ctxInc is derived for each bit of the syntax element, the bit is decoded using the context, and the CABAC state of the context used is updated. Bits that do not use the context are decoded with an equal probability (EP, bypass), and ctxInc derivation and CABAC state are omitted. Decoded syntax elements include prediction information to generate a prediction image, prediction residuals to generate a difference image, and the like.

The entropy decoder 301 outputs decoded codes to the parameter decoder 302. For example, the decoded codes include, for example, a prediction mode predMode, merge_flag, merge_idx, inter_pred_idc, refIdxLX, mvp_LX_idx, mvdLX, and amvr_mode. Which code is to be decoded is controlled based on an indication of the parameter decoder 302.

Basic Flow

Figure 7:
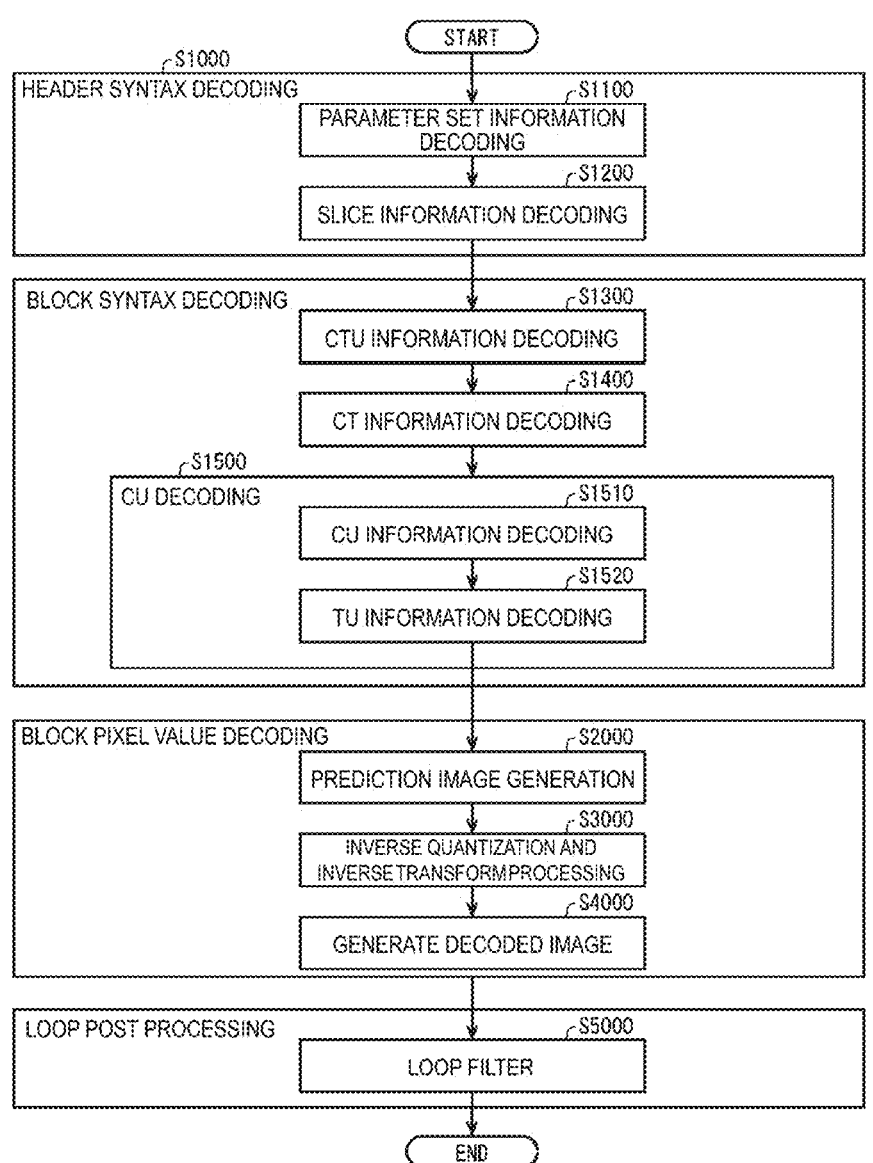
FIG. 7 is a flowchart illustrating a schematic operation of the video decoding apparatus.

FIG. 7 is a flow chart illustrating a schematic operation of the video decoding apparatus 31.

(S1100: Decode Parameter Set Information) The header decoder 3020 decodes the parameter set information such as VPS, SPS, and PPS from the coded data.

(S1200: Decode Slice Information) The header decoder 3020 decodes the slice header (slice information) from the coded data.

Subsequently, the video decoding apparatus 31 derives the decoded image of each CTU by repeating the processing from S1300 to S5000 for each CTU included in the target picture.

(S1300: Decode CTU Information) The CT information decoder 3021 decodes CTUs from the coded data.

(S1400: Decode CT information) The CT information decoder 3021 decodes CTs from the coded data.

(S1500: Decode CUs) The CU decoder 3022 performs S1510 and S1520 to decode CUs from the coded data.

(S1510: Decode CU information) The CU decoder 3022 decodes CU information, prediction information, TU split flag split_transform_flag, CU residual flags cbf_cb, cbf_cr, cbf_luma, and the like from the coded data.

(S1520: Decode TU information) In a case that the TU includes a prediction residual, the TU decoder 3024 decodes the QP update information, the quantization prediction residual, and the transform index mts_idx from the coded data. Note that the QP update information is a difference value from a quantization parameter prediction value qPpred, which is a prediction value for a quantization parameter QP.

(S2000: Generate Prediction Image) The prediction image generation unit 308 generates the prediction image based on the prediction information on each block included in the target Cu.

(S3000: Inverse Quantization and Inverse Transform) The inverse quantization and inverse transform processing unit 311 performs inverse quantization and inverse transform processing on each of the TUs included in the target Cu.

(S4000: Generated Decoded Image) The addition unit 312 generates the decoded image of the target CU by adding the prediction image supplied by the prediction image generation unit 308 and the prediction residual supplied by the inverse quantization and inverse transform processing unit 311.

(S5000: Loop Filter) The loop filter 305 applies a loop filter such as a deblocking filter, SAO, or ALF to the decoded image to generate a decoded image.

Configuration of Inter Prediction Parameter Derivation Unit

Figure 9:
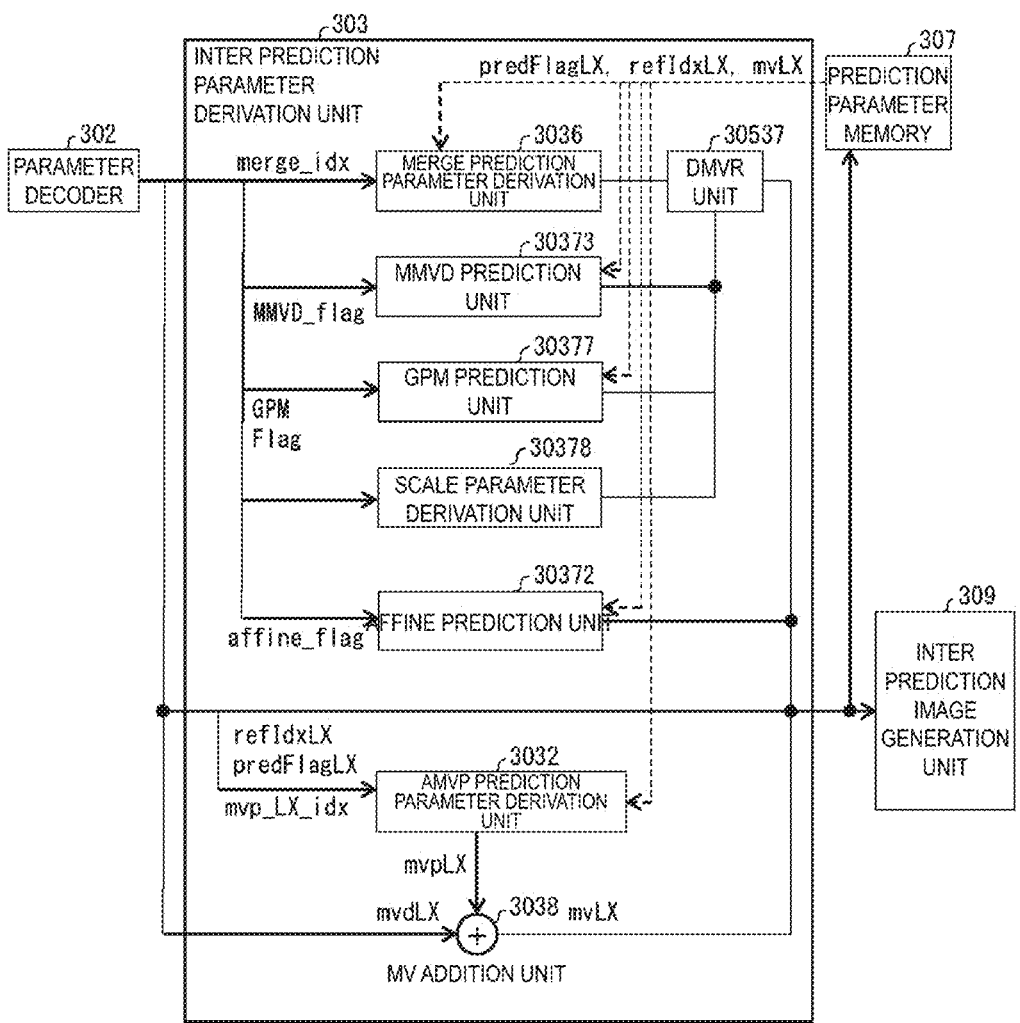
FIG. 9 is a schematic diagram illustrating a configuration of an inter prediction parameter derivation unit.

FIG. 9 is a schematic diagram illustrating a configuration of an inter prediction parameter derivation unit 303 according to the present embodiment. The inter prediction parameter derivation unit 303 derives an inter prediction parameter with reference to a prediction parameter stored in the prediction parameter memory 307, based on the syntax element input from the parameter decoder 302. The inter prediction parameter is output to the inter prediction image generation unit 309 and the prediction parameter memory 307. The inter prediction parameter derivation unit 303 and internal elements of the inter prediction parameter derivation unit 303 including an AMVP prediction parameter derivation unit 3032, a merge prediction parameter derivation unit 3036, an affine prediction unit 30372, an MMVD prediction unit 30373, a GPM prediction unit 30377, a DMVR unit 30537, and an MV addition unit 3038 are means common to the video coding apparatus and the video decoding apparatus, and may thus collectively be referred to as a motion vector derivation unit (motion vector derivation apparatus).

The scale parameter derivation unit 30378 derives a scaling ratio RefPicScale[i][j][0] of the reference picture in the horizontal direction, a scaling ratio RefPicScale[i][j][1] of the reference picture in the vertical direction, and RefPicIsScaled[i][j] indicating whether the reference picture is scaled. Here, i indicates whether the reference picture list is the L0 list or the L1 list, and j is derived as a value for an L0 reference picture list or an L1 reference picture y list as follows.

---

```
RefPicScale[i][j][0] =
    (fRefWidth << 14) + (PicOutputWidthL >> 1))/PicOutputWidthL
RefPicScale[i][j][1] =
    ((fRefHeight << 14) + (PicOutputHeightL >>
1))/PicOutputHeightL
    RefPicIsScaled[i][j] =
    (RefPicScale[i][j][0] != (1 << 14)) ||
(RefPicScale[i][j][1] != (1 << 14))
```

---

Here, the variable PicOutputWidthL is a value for calculating a horizontal scaling ratio in a case that the coded picture is referenced, and is a value obtained by subtracting a lateral offset value from the number of horizontal pixels of the luminance of the coded picture. The variable PicOutputHeightL is a value for calculating a vertical scaling ratio in a case that the coded picture is referenced, and is a value obtained by subtracting a vertical offset value from the number of vertical pixels of the luminance of the coded picture. The variable fRefWidth is the value of PicOutputWidthL of a reference picture with a reference list value j in a list i, and the variable fRefHight is the value of PicOutputHeightL of the reference picture with the reference picture list value j in the list i.

In a case that the affine_flag is 1, i.e., the affine_flag indicates an affine prediction mode, the affine prediction unit 30372 derives an inter prediction parameter in sub-block units.

In a case that mmvd_flag is 1, i.e., mmvd_flag indicates an MMVD prediction mode, the MMVD prediction unit 30373 derives the inter prediction parameter from a merge candidate and a differential vector derived by the merge prediction parameter derivation unit 3036.

In a case that GPM Flag is 1, i.e., GPM Flag indicates a Geometric Partitioning Mode (GPM) prediction mode, the GPM prediction unit 30377 derives a GPM prediction parameter.

In a case that merge_flag is 1, i.e., merge_flag indicates a merge prediction mode, merge_idx is derived and output to the merge prediction parameter derivation unit 3036.

In a case that merge_flag is 0, i.e., merge_flag indicates an AMVP prediction mode, the AMVP prediction parameter derivation unit 3032 derives mvpLX from inter_pred_idc, refIdxLX, or mvp_Lx_idx.

MV Addition Unit

The MV addition unit 3038 adds derived mvpLX and mvdLX to derive mvLX.

Affine Prediction Unit

The affine prediction unit 30372 derives 1) motion vectors for two control points CP0 and CP1 or three control points CP0, CP1, and CP2 of the target block, 2) derives an affine prediction parameter of the target block, and 3) derives a motion vector for each sub-block from the affine prediction parameter.

In the case of a merge affine prediction, a motion vector cpMvLX[ ] for each of the control points CP0, CP1, and CP2 is derived from the motion vector of the neighboring block of the target block. In the case of inter affine prediction, cpMvLX[ ] for each control point is derived from the sum of prediction vectors for the control points CP0, CP1, and CP2 and a difference vector mvdCpLX[ ] derived from the coded data.

Merge Prediction

Figure 10:
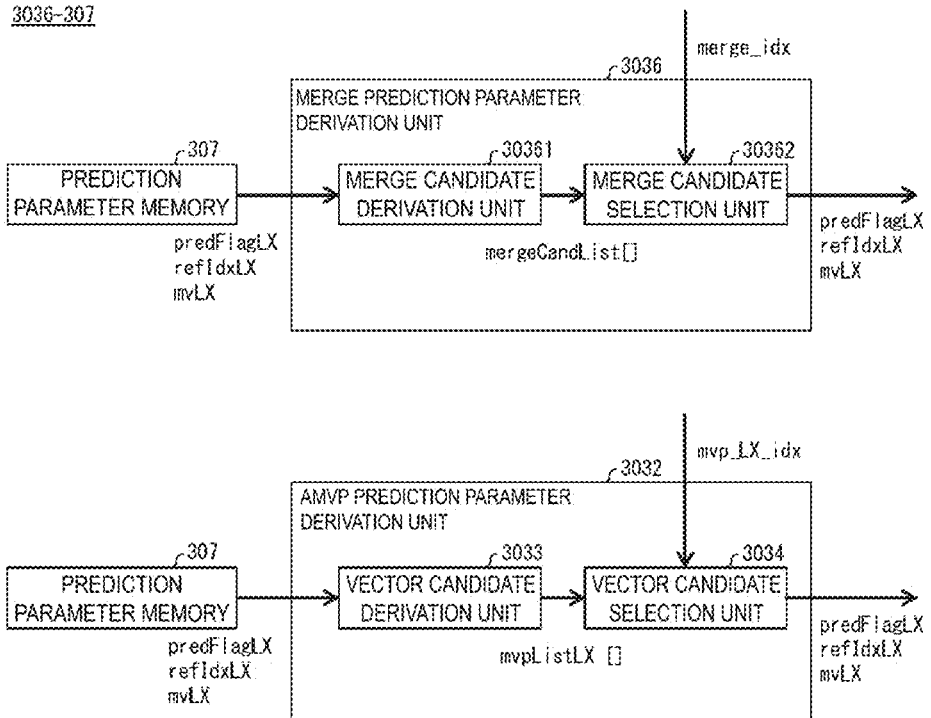
FIG. 10 is a schematic diagram illustrating a configuration of a merge prediction parameter derivation unit and an AMVP prediction parameter derivation unit.

FIG. 10 is a schematic diagram illustrating a configuration of the merge prediction parameter derivation unit 3036 according to the present embodiment. The merge prediction parameter derivation unit 3036 includes a merge candidate derivation unit 30361 and a merge candidate selection unit 30362. Note that merge candidates include prediction parameters (predFlagLX, mvLX, and refIdxLX) and are stored in a merge candidate list. The merge candidates stored in the merge candidate list are assigned indexes according to a prescribed rule.

The merge candidate derivation unit 30361 directly uses motion vectors for decoded adjacent blocks and refIdxLX to derive merge candidates. Otherwise, the merge candidate derivation unit 30361 may employ spatial merge candidate derivation processing, temporal merge candidate derivation processing, pairwise merge candidate derivation processing, and zero merge candidate derivation process described below.

As the spatial merge candidate derivation processing, the merge candidate derivation unit 30361 reads the prediction parameter stored in the prediction parameter memory 307 in accordance with a prescribed rule, and sets the prediction parameter as a merge candidate. The reference picture specification method is, for example, a prediction parameter relating to each of neighboring blocks within a predetermined range from the target block (e.g., all or some of blocks located to the left A1 of, to the right B1 of, above and to the right B0 of, below and to the left A0 of, and above and to the left B2 of the target block). The merge candidates are designated as A1, B1, B0, A0, and B2.

Here, A1, B1, B0, A0, and B2 are motion information derived from blocks including the following coordinates. In the target picture in FIG. 8, positions of A1, B1, B0, A0, and B2 are illustrated at the positions of the merge candidates.

A1: (xCb−1, yCb+cbHeight−1)
B1: (xCb+cbWidth−1, yCb−1)
B0: (xCb+cbWidth, yCb−1)
A0: (xCb−1, yCb+cbHeight)
B2: (xCb−1, yCb−1)

The upper left coordinates of the target block are assumed to be (xCb, yCb), and the target block is assumed to have a width cbWidth and a height cbHeight.

Figure 8:
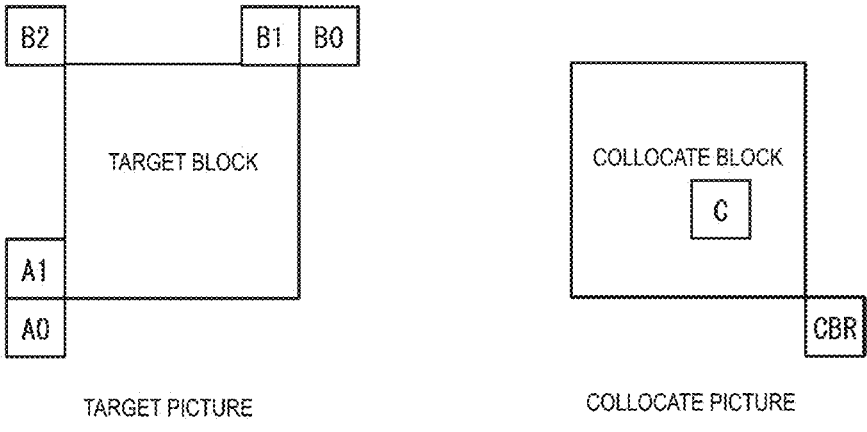
FIG. 8 is a diagram illustrating an arrangement of merge candidates.

As temporal merge derivation processing, the merge candidate derivation unit 30361 reads out, as illustrated in a collocate picture of FIG. 8, prediction parameters for a block C in the reference image, including a lower right CBR or central coordinates of the target block, from the prediction parameter memory 307 as merge candidates Col, and stores the prediction parameters in the merge candidate list merge-CandList[ ].

In general, the block CBR is preferentially added to the mergeCandList[ ], and in a case that the CBR includes no motion vector (e.g., an intra prediction block) or in a case that the CBR is located outside of the picture, a motion vector for the block C is added to the prediction vector candidate. By adding a motion vector for a collocated block that is likely to move differently as the prediction candidates, the number of selections for the prediction vector increases to improve coding efficiency.

In a case that ph_temporal_mvp_enabled_flag is 0 or cbWidth*cbHeight is 32 or less, a collocated movement vector mvLXCol for the target block is set to 0, and an available flag availableFlagLXCol of a collocated block is set to 0.

Otherwise (SliceTemporalMvpEnabledFlag is 1), the following is performed.

For example, the merge candidate derivation unit 30361 may derive the position of C (xColCtr, yColCtr) and the position of CBR (xColCBr, yColCBr) using the following equation:

$$xColCtr = xCb + (cbWidth \gg 1)$$
$$yColCtr = yCb + (cbHeight \gg 1)$$
$$xColCBr = xCb + cbWidth$$
$$yColCBr = yCb + cbHeight$$

In a case that the CBR is available, the motion vector for the CBR is utilized to derive a merge candidate COL. In a case that the CBR is unavailable, the COL is derived using C. Then, availableFlagLXCol is set to 1. Note that the reference picture may be collocated_ref_idx notified in the slice header.

The pairwise candidate derivation unit derives a pairwise candidate avgK from the average of two merge candidates (p0Cand and p1Cand) stored in mergeCandList, and stores pairwise candidate avgK in mergeCandList[ ].

$$mvLXavgK[0] = (mvLXp0Cand[0] + mvLXp1Cand[0])/2$$
$$mvLXavgK[1] = (mvLXp0Cand[1] + mvLXp1Cand[1])/2$$

The merge candidate derivation unit 30361 derives zero merge candidates Z0, . . . , ZM for which refIdxLX is 0 . . . M and for which an X component and a Y component of mvLX are both 0, and stores the zero merge candidates in the merge candidate list.

The order of storage in mergeCandList[ ] is, for example, the spatial merge candidate (A1, B1, B0, A0, or B2), the temporal merge candidate Col, the pairwise candidate avgK, and the zero merge candidate ZK. Note that reference blocks that are not available (for example, the block is intended for intra prediction) are not stored in the merge candidate list.

```
i = 0
if (availableFlagA1)
    mergeCandList [i++] = A1
if (availableFlagB1)
    mergeCandList [i++] = B1
if (availableFlagB0)
    mergeCandList [i++] = B0
if (availableFlagA0)
    mergeCandList [i++] = A0
if (availableFlagB2)
    mergeCandList [i++] = B2
if (availableFlagCol)
    mergeCandList [i++] = Col
if (availableFlagAvgK)
```

-continued

| |
|---|
| mergeCandList [i++] = avgK |
| if (i < MaxNumMergeCand) |
| mergeCandList [i++] = ZK |

The merge candidate selection unit 30362 selects, from the merge candidates included in the merge candidate list, a merge candidate N indicated by merge_idx in accordance with the following equation.

$$N = mergeCandList[\text{merge\_idx}]$$

Here, N is a label indicating a merge candidate, and assumes A1, B1, B0, A0, B2, Col, avgK, ZK, and the like. The motion information of the merge candidate indicated by the label N is indicated by (mvLXN[0], mvLXN[0]), pred-FlagLXN, and refIdxLXN.

Selected (mvLXN[0], mvLXN[0]), predFlagLXN, and refIdxLXN are selected as inter prediction parameters for the target block. The merge candidate selection unit 30362 stores the selected inter prediction parameters for the merge candidate in the prediction parameter memory 307, and outputs the selected inter prediction parameters to the inter prediction image generation unit 309.

DMVR

Next, a Decoder side Motion Vector Refinement (DMVR) processing performed by a DMVR unit 30375 will be described. In a case that merge_flag is 1 or the skip flag skip_flag is 1 for the target Cu, the DMVR unit 30375 modifies mvLX of the target CU derived by a merge prediction unit 30374 using a reference image. Specifically, in a case that the prediction parameter that the merge prediction unit 30374 derives is of bi-prediction, the motion vector is modified using a prediction image derived from the motion vector in a case of correspondence to two reference pictures. mvLX modified is supplied to the inter prediction image generation unit 309.

In addition, in the derivation of the flag dmvrFlag specifying whether to perform the DMVR processing, one of multiple conditions for setting dmvrFlag to 1 is such that the value of RefPicIsScaled[0][refIdxL0] described is 0 and that the value of RefPicIsScaled[1][refIdxL1] is 0. In a case that the value of dmvrFlag is set to 1, the DMVR processing by the DMVR unit 30375 is executed.

In addition, in the derivation of the flag dmvrFlag specifying whether to perform the DMVR processing, one of multiple conditions for setting dmvrFlag to 1 is such that ciip flag is 0, in other words, IntraInter composition processing is not applied.

In addition, in the derivation of the flag dmvrFlag specifying whether to perform the DMVR processing, one of multiple conditions for setting the dmvrFlag to 1 is such that luma_weight_l0_flag[i] is 0, luma_weight_l0_flag[i] being a flag indicating whether coefficient information regarding a weighted prediction for the L0 prediction for luminance described below is present and that the value of luma_weight_l1 flag[i] is 0, luma_weight_l1_flag[i] being a flag indicating whether coefficient information regarding a weighted prediction for the L1 prediction for luminance is present. In a case that the value of dmvrFlag is set to 1, the DMVR processing by the DMVR unit 30375 is executed.

Note that, in the derivation of the flag dmvrFlag specifying whether to perform the DMVR processing, one of multiple conditions for setting dmvrFlag to 1 may be such that luma_weight_l0_flag[i] is 0 and that the value of luma_weight_l1_flag[i] is 0 and that chroma_weight_l0_flag[i] is 0, chroma_weight_l0_flag[i] being a flag indicating whether coefficient information regarding a weighted prediction for the L0 prediction for chroma described below is present and that chroma_weight_l1_flag[i] is 0, chroma_weight_l1_flag[i] being a flag indicating whether coefficient information regarding a weighted prediction for the L1 prediction for chroma is present. In a case that the value of dmvrFlag is set to 1, the DMVR processing by the DMVR unit 30375 is executed.

Prof

In addition, in a case that the value of RefPicIsScaled[0][refIdxLX] is 1 or the value of RefPicIsScaled[1][refIdxLX] is 1, the value of cbProfFlagLX is set to FALSE. Here, cbProfFlagLX is a flag that specifies whether to perform the Prediction refinement (PROF) of the affine prediction.

AMVP Prediction

FIG. 10 is a schematic diagram illustrating a configuration of the AMVP prediction parameter derivation unit 3032 according to the present embodiment. The AMVP prediction parameter derivation unit 3032 includes a vector candidate derivation unit 3033 and a vector candidate selection unit 3034. The vector candidate derivation unit 3033 derives prediction vector candidates from motion vectors for decoded neighboring blocks stored in the prediction parameter memory 307 based on refIdxLX, and stores the predicted vector candidates in the prediction vector candidate list mvpListLX[ ].

The vector candidate selection unit 3034 selects a motion vector mvpListLX[mvp_Lx_idx] indicated by mvp_Lx_idx, from the prediction vector candidates in mvpListLX[ ] as mvpLX. The vector candidate selection unit 3034 outputs mvpLX selected to the MV addition unit 3038.

MV Addition Unit

The MV addition unit 3038 adds mvpLX input from the AMVP prediction parameter derivation unit 3032 and mvdLX decoded to calculate mvLX. The addition unit 3038 outputs the mvLX calculated to the inter prediction image generation unit 309 and the prediction parameter memory 307.

$$mvLX[0] = mvpLX[0] + mvdLX[0]$$

$$mvLX[1] = mvpLX[1] + mvdLX[1]$$

Detailed Classification of Subblock Merge

The types of prediction processing with which the sub-block merge is associated will be summarized. As described above, the prediction processing is roughly classified into a merge prediction and an AMVP prediction.

The merge prediction is further categorized as follows.

Normal merge prediction (block-based merge prediction)

Subblock merge prediction

The sub-block merge prediction is further categorized as follows.

Subblock prediction (ATMVP)

Affine prediction

Inferred affine prediction

Constructed affine prediction

On the other hand, the AMVP prediction is categorized as follows:

AMVP (translation)

MVD Affine Projection

The MVD affine prediction is further categorized as follows:

4 Parameter MVD Affine prediction

6 Parameter MVD Affine prediction

Note that the MVD affine prediction refers to an affine prediction used by decoding a difference vector.

In the sub-block prediction, similar to the temporal merge derivation processing, the availability of a collocate sub-block COL of the target sub-block availableFlagSbCol is determined, and in a case that the collocate sub-block COL is available, a prediction parameter is derived. At least in a case that SliceTemporalMvpEnabledFlag described above is 0, availableFlagSbCol is set to 0.

Merge with Motion Vector Difference (MMVD prediction) may be classified as a merge prediction or an AMVP prediction. In the former, for merge_flag=1, mmvd_flag and MMVD-related syntax elements are decoded in the case of merge_flag=1, and in the latter case, for merge_flag=0, mmvd_flag and MMVD-related syntax elements are decoded.

The loop filter 305 is a filter provided in a coding loop to remove block distortion and ringing distortion and improve image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores a decoded image of the CU in a position predetermined for each target picture and for each target CU.

The prediction parameter memory 307 stores the prediction parameter in a position predetermined for each CTU or CU. Specifically, the prediction parameter memory 307 stores parameters decoded by the parameter decoder 302, parameters derived by the prediction parameter derivation unit 320, and the like.

The parameters derived by the prediction parameter derivation unit 320 is input to the prediction image generation unit 308. In addition, the prediction image generation unit 308 reads a reference picture from the reference picture memory 306. The prediction image generation unit 308 generates a prediction image of a block or a subblock by using the parameters and the reference picture (reference picture block) in the prediction mode indicated by pred-Mode. Here, the reference picture block refers to a set of pixels (referred to as a block because the blocks normally constitute a rectangle) on a reference picture and is a region that is referenced to generate a prediction image.

Inter Prediction Image Generation Unit 309

In a case that predMode indicates an inter prediction mode, the inter prediction image generation unit 309 generates a prediction image of a block or a subblock by the inter prediction using the inter prediction parameters input from the inter prediction parameter derivation unit 303 and the reference picture.

Figure 11:
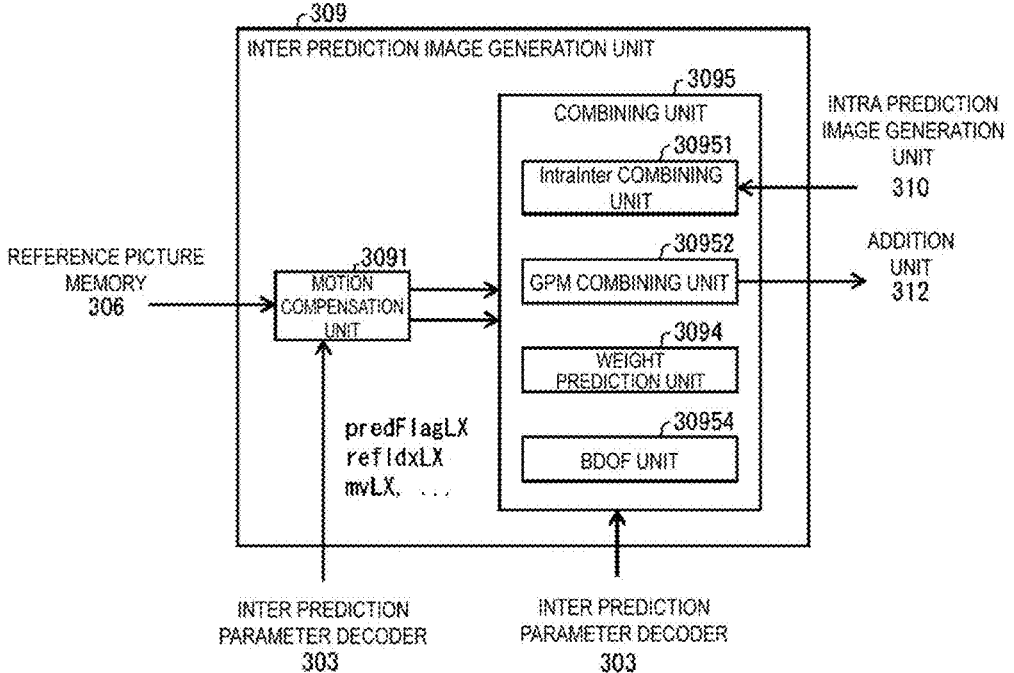
FIG. 11 is a schematic diagram illustrating a configuration of an inter prediction image generation unit.

FIG. 11 is a schematic diagram illustrating a configuration of the inter prediction image generation unit 309 included in the prediction image generation unit 308 according to the present embodiment. The inter prediction image generation unit 309 includes a motion compensation unit (prediction image generation apparatus) 3091 and a combining unit 3095. The combining unit 3095 includes a IntraInter combining unit 30951, a GPM combining unit 30952, a BDOF unit 30954, and a weighted prediction unit 3094.

Motion Compensation

The motion compensation unit 3091 (interpolation image generation unit 3091) generates an interpolation image (motion compensation image) by reading out the reference block from the reference picture memory 306, based on the inter prediction parameters (predFlagLX, refIdxLX, and mvLX) input from the inter prediction parameter derivation unit 303. The reference block is a block at a position shifted by mvLX from the position of the target block on the reference picture RefPicLX designated by refIdxLX. Here, in a case that mvLX is not an integer precision, a filter referred to as a motion compensation filter and used to generate pixels at fractional positions is applied to generate an interpolation image.

First, the motion compensation unit 3091 derives an integer position (xInt, yInt) and a phase (xFrac, yFrac) corresponding to the coordinates of the prediction block (x, y), according to the following equation.

$$xInt = xPb + (mvLX[0] \gg (\log 2(MVPREC))) + x$$

$$xFrac = mvLX[0] \ \& \ (MVPREC - 1)$$

$$yInt = yPb + (mvLX[1] \gg (\log 2(MVPREC))) + y$$

$$yFrac = mvLX[1] \ \& \ (MVPREC - 1)$$

Here, (xPb, yPb) indicates the upper left coordinates of a block with a bW*bH size, x=0 . . . bW−1, y=0 . . . bH−1, and MVPREC indicates mvLX accuracy (1/MVPREC pixel accuracy). For example, MVPREC=16.

The motion compensation unit 3091 derives a temporary image temp[ ][ ] by performing horizontal interpolation processing on a reference picture refImg using the interpolation filter. $\Sigma$ described below is a sum related to k=0 . . . NTAP−1, shift1 is a normalization parameter that adjusts the range of values, offset1=1<<(shift1−1).

$$temp[x][y] = (\Sigma mcFilter[xFrac][k] *$$

$$refImg[xInt + k - NTAP/2 + 1][yInt] + offset1) \gg shift1$$

Subsequently, the motion compensation unit 3091 derives an interpolation image Pred[ ][ ] by performing vertical interpolation processing on a temporal image temp[ ][ ]. $\Sigma$ described below is a sum related to k=0 . . . NTAP−1, shift2 is a normalization parameter that adjusts the range of values, offset2=1<<(shift2−1).

$$Pred[x][y] =$$

$$(\Sigma mcFilter[yFrac][k] * temp[x][y + k - NTAP/2 + 1] + offset2) \gg shift2$$

Note that in the case of bi-prediction, Pred[ ][ ] described above is derived for each L0 list and for each L1 list (referred to as interpolation image PredL0[ ][ ] and PredL1[ ][ ]), and an interpolation image Pred[ ][ ] is generated from PredL0[ ][ ] and PredL1[ ][ ].

Note that the motion compensation unit 3091 has a function to scale the interpolation image in accordance with a horizontal scaling ratio RefPicScale[i][j][0] for the reference picture and a vertical scaling ratio RefPicScale[i][j][1] for the reference picture derived by the scale parameter derivation unit 30378.

The combining unit 3095 includes a IntraInter combining unit 30951, a GPM combining unit 30952, a weighted prediction unit 3094, and a BDOF unit 30954.

Interpolation Filter Processing

Description will be given of interpolation filter processing performed by the prediction image generation unit 308 and performed in a case that the resampling described above is applied to vary the size of the reference picture during a single sequence. Note that the processing may be performed by the motion compensation unit 3091, for example.

In a case that the value of RefPicIsScaled[i][j] input from the inter prediction parameter derivation unit 303 indicates that the reference picture is scaled, the prediction image generation unit 308 switches multiple filter coefficients and performs the interpolation filter processing.

IntraInter Composition Processing

The IntraInter combining unit 30951 generates a prediction image by the weighted sum of the inter prediction image and the intra prediction image.

Pixel values of the prediction image predSamplesComb [x][y] are derived as follows in a case that a flag ciip flag indicating whether to apply IntraInter Composition processing is 1.

$$predSamplesComb[x][y] =$$

$$(w * predSamplesIntra[x][y] + (4 - w) * predSamplesInter[x][y] + 2) \gg 2$$

Here, predSamplesIntra[x][y] indicates an intra prediction image and is limited to a planar prediction. predSamplesInter[x][y] indicates a reconstructed inter prediction image.

A weight w is derived as follows:

In a case that both the lowermost block to the left of and adjacent to the target coding block and the rightmost block above and adjacent to the target coding block are of intra prediction, w is set to 3.

Otherwise, in a case that neither of the lowermost block to the left of and adjacent to the target coding block and the rightmost block above and adjacent to the target coding block are of intra prediction, w is set to 1.

Otherwise, w is set to 2.

GPM Composition Processing

The GPM combining unit 30952 generates a prediction image using the GPM prediction described above.

BDOF Prediction

Now, details of a BDOF prediction (Bi-Directional Optical Flow, BDOF processing) performed by the BDOF unit 30954 will be described. In the bi-prediction mode, the BDOF unit 30954 generates a prediction image with reference to two prediction images (first prediction image and second prediction image) and a gradient correction term.

Weighted Prediction

The weighted prediction unit 3094 generates a prediction image pbSamples of the block from an interpolation image predSamplesLX.

First, a variable weightedPredFlag indicating whether to perform weighted prediction processing is derived as follows. In a case that the slice_type is equal to p, weightedPredFlag is set equal to pps_weighted_pred_flag defined by PPS. Otherwise, in a case that the slice_type is equal to B, weightedPredFlag is set equal to pps_weighted_bipred flag && (!dmvrFlag) defined by PPS.

Hereinafter, bcw_idx is a weight index for a bi-prediction with weights in CU units. In a case that bcw_idx is not notified, bcw_idx=0 is set. For bcwIdx, in the merge prediction mode, bcwIdxN of a neighboring block is set, and in the AMVP prediction mode, bcw_idx of the target block is set.

In a case that the value of the variable weightedPredFlag is equal to 0 or the value of the variable bcwIdx is 0, as normal prediction image processing, the prediction image pbSamples is derived as follows.

In a case that one of the prediction list utilization flag (predFlagL0 or predFlagL1) is 1 (uni-prediction) (weighted prediction is not used), processing based on the following equation is performed in which predSamplesLX (LX is L0 or L1) is fitted with the number of pixel bits bitDepth.

$$pbSamples [x] [y] = Clip3(0, (1 \ll bitDepth) - 1,$$
$$(predSamplesLX [x] [y] + offset1) \gg shift1)$$
Here, shift1 = 14 - bitDepth, offset1 = 1 ≪ (shift1 - 1) .
PredLX is an interpolation image for an L0 or L1 prediction.

In addition, in a case that both of the prediction list utilization flags (predFlagL0 and predFlagL1) are 1 (bi-prediction PRED_BI) and the weighted prediction is not used, processing based on the following equation is performed in which predSamplesL0 and predSamplesL1 are averaged and fitted with the number of pixel bits.

$$pbSamples [x] [y] = Clip3(0, (1 \ll bitDepth) - 1,$$
$$(predSamplesL0 [x] [y] + predSamplesL1 [x] [y] + offset2) \gg shift2)$$
Here, shift2 = 15 - bitDepth, offset2 = 1 ≪ (shift2-1) .

In a case that the value of the variable weightedPredFlag is equal to 1 and the value of the variable bcwIdx is equal to 0, as weighted prediction processing, the prediction image pbSamples is derived as follows:

The variable shift1 is set equal to Max(2, 14−bitDepth). Variables log 2Wd, o0, o1, w0, and w1 are derived as follows:

In a case of cIdx of 0 and luminance, the following applies:

log 2Wd=luma_log 2_weight_denom+shift1 w0=LumaWeightL0[refIdxL0]

w1=LumaWeightL1[refIdxL1]

o0=luma_offset_l0[refIdxL0]≪(bitDepth−8)

o1=luma_offset_l1[refIdxL1]≪(bitDepth−8)

Otherwise (in a case that cIdx is not equal to 0 and chroma), the following applies:

log 2Wd=ChromaLog2WeightDenom+shift1 w0=ChromaWeightL0[refIdxL0][cIdx−1]

w1=ChromaWeightL1[refIdxL1][cIdx−1]

o0=ChromaOffsetL0[refIdxL0][cIdx−1]≪(bitDepth−8)

o1=ChromaOffsetL1[refIdxL1][cIdx−1]≪(bitDepth−8)

The pixel value pbSamples[x][y] of a prediction image with x=0 . . . nCbW−1 and y=0 . . . nCbH−1 is derived as follows.

In a case that predFlagL0 is equal to 1 and predFlagL1 is equal to 0, the pixel value pbSamples[x][y] of the prediction image is derived as follows.

```
if(log2Wd >= 1)
    pbSamples[x][y] = Clip3 (0, (1 << bitDepth) − 1,
    (predSamplesL0[x][y] * w0 + 2 ^ (log2wd−1)) >> log2Wd) +
o0)
    else{
    pbSamples[x][y]=Clip3(0, (1 << bitDepth) − 1,
predSamplesL0[x][y] * w0 + o0)
```

Otherwise, in a case that predFlagL0 is 0 and predFlagL1 is 1, the pixel value pbSamples[x][y] of the prediction image is derived as follows.

```
if(log2Wd >= 1)
    pbSamples[x][y] = Clip3 (0, (1 << bitDepth) − 1,
    (predSamplesL1[x][y] * w1 + 2 ^ (log2Wd−1)) >> log2Wd) +
o1)
    else{
    pbSamples[x][y] = Clip3 (0, (1 << bitDepth) −1,
predSamplesL1[x][y] * w1 + o1)
```

Otherwise, in a case that predFlagL0 is equal to 1 and predFlagL1 is equal to 1, the pixel value spbSamples[x][y] of the prediction image is derived as follows.

```
pbSamples [x] [y] = Clip3(0, (1 << bitDepth) − 1,
predSamplesLO [x] [y] * w0 + predSamplesL1 [x] [y] * w1 +
( (o0 + o1 + 1) << log2Wd) >> (log2Wd + 1) )
BCW Prediction
    The BCW (Bi-prediction with CU-level Weights) prediction is
a prediction method enabling switching of a pre-determined
weight coefficient at a CU level.
```

The following are input: two variables nCbW and nCbH specifying the width and height of the current coding block, two arrays predSamplesL0 and predSamplesL1 of (nCbW)× (nCbH), flags predFlagL0 and predFlagL1 indicating whether to use a prediction list, the reference indexes refIdxL0 and refIdxL1, a BCW prediction index bcw_idx, and the variable cIdx specifying the index of a luminance or a chroma component. BCW prediction processing is performed, and the pixel value of the prediction image of the array pbSamples of (nCbW)×(nCbH) is output.

In a case that sps_bcw_enabled_flag indicating whether the prediction is used at the SPS level is TRUE, a variable weightedPredFlag is 0, and reference pictures indicated by the two reference indexes refIdxL0 and refIdxL1 include no weighted prediction coefficients, and the coding block size is equal to or less than a constant value, bcw_idx of a syntax for the CU level is explicitly notified, and the variable bcwIdx is set equal to the value. In a case that bcw_idx is not present, variable bcwIdx is set equal to 0.

In a case that the variable bcwIdx is 0, the pixel value of the prediction image is derived as follows.

```
pbSamples [x] [y] = Clip3(0, (1 << bitDepth) − 1,
    predSamplesL0 [x] [y] + predSamplesL1 [x] [y] + offset2) >>
shift2)
```

Otherwise (in a case that bcwIdx is not equal to 0), the following applies:

The variable w1 is set equal to bcwWLut [bcwIdx]. bcwWLut[k]={4, 5, 3, 10, −2}.

The variable w0 is set to (8−w1). The pixel value of the prediction image is derived as follows.

```
pbSamples [x] [y] =Clip3 (0, (1 << bitDepth) − 1,
w0 * predSamplesL0 [x] [y] +
w1 * predSamplesL1 [x] [y] + offset3) >> (shift2 + 3)
```

In a case that the BCW prediction is used in the AMVP prediction mode, the inter prediction parameter decoder 303 decodes bcw_idx and sends bcw_idx decoded to the BCW unit 30955. In a case that the BCW prediction is used in the merge prediction mode, the inter prediction parameter decoder 303 decodes the merge index merge_idx, and the merge candidate derivation unit 30361 derives bcwIdx of each merge candidate. Specifically, the merge candidate derivation unit 30361 uses the weight coefficient for the adjacent block used for derivation of the merge candidate as the weight coefficient for the merge candidate used in the target block. That is, in the merge mode, the weight coefficient previously used is inherited as the weight coefficient for the target block.

Intra Prediction Image Generation Unit 310

In a case that predMode indicates an intra prediction mode, the intra prediction image generation unit 310 performs an intra prediction by using intra prediction parameters input from the intra prediction parameter derivation unit 304 and reference pixels read from the reference picture memory 306.

The inverse quantization and inverse transform processing unit 311 performs inverse quantization on a quantization transform coefficient input from the parameter decoder 302 to calculate a transform coefficient.

The addition unit 312 adds, for each pixel, the prediction image of the block input from the prediction image generation unit 308 and the prediction residual input from the inverse quantization and inverse transform processing unit 311 to generate a decoded image of the block. The addition unit 312 stores the decoded image of the block in the reference picture memory 306 and outputs the decoded image to the loop filter 305.

The inverse quantization and inverse transform processing unit 311 performs inverse quantization on a quantization transform coefficient input from the parameter decoder 302 to calculate a transform coefficient.

The addition unit 312 adds, for each pixel, the prediction image of the block input from the prediction image generation unit 308 and the prediction residual input from the inverse quantization and inverse transform processing unit 311 to generate a decoded image of the block. The addition unit 312 stores the decoded image of the block in the reference picture memory 306 and outputs the decoded image to the loop filter 305.

Configuration of Video Coding Apparatus

Figure 12:
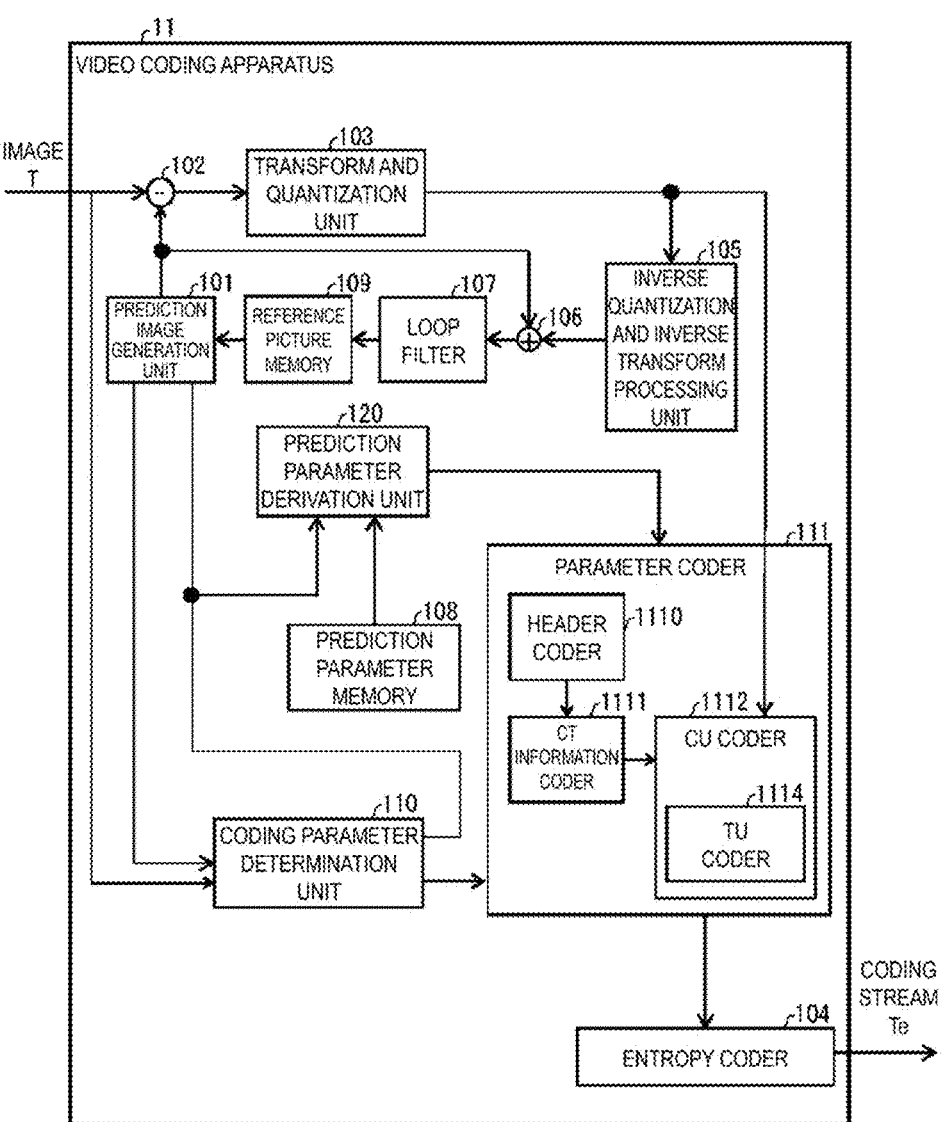
FIG. 12 is a block diagram illustrating a configuration of a video coding apparatus.

Now, a configuration of the video coding apparatus 11 according to the present embodiment will be described. FIG. 12 is a block diagram illustrating a configuration of the video coding apparatus 11 according to the present embodiment. The video coding apparatus 11 includes the prediction image generation unit 101, a subtraction unit 102, a transform and quantization unit 103, an entropy coder 104, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a prediction parameter coder 111, a prediction parameter derivation unit 120, and an entropy coder 104.

The prediction image generation unit 101 generates a prediction image for each CU. The prediction image generation unit 101 includes the inter prediction image generation unit 309 and the intra prediction image generation unit 310 that are described above, and descriptions of the prediction image generation unit 101 are omitted.

The subtraction unit 102 subtracts the pixel value of the prediction image of the block input from the prediction image generation unit 101 from the pixel value of the image T to generate a prediction residual. The subtraction unit 102 outputs the prediction residual to the transform and quantization unit 103.

The transform and quantization unit 103 performs a frequency transform on the prediction residual input from the subtraction unit 102 to calculate a transform coefficient, and derives a quantization transform coefficient through quantization. The transform and quantization unit 103 outputs the quantization transform coefficient to the parameter coder 111 and the inverse quantization and inverse transform processing unit 105.

The inverse quantization and inverse transform processing unit 105 is the same as the inverse quantization and inverse transform processing unit 311 (FIG. 6) in the video decoding apparatus 31, and descriptions of the inverse quantization and inverse transform processing unit 105 are omitted. The calculated prediction residual is output to the addition unit 106.

The parameter coder 111 includes a header coder 1110, a CT information coder 1111, and a CU coder 1112 (prediction mode coder). The CU coder 1112 further includes a TU coder 1114. General operation of each module will now be described.

The header coder 1110 performs coding processing on header information, split information, prediction information, parameters such as transform parameter coefficients, and the like.

The CT information coder 1111 codes QT, MT (BT, TT) split information, and the like.

The CU coder 1112 codes the CU information, the prediction information, the split information, and the like.

In a case that the TU includes a prediction residual, the TU coder 1114 codes the QP update information and the quantization prediction residual.

The CT information coder 1111 and the CU coder 1112 supply the parameter coder 111 with inter prediction parameters (predMode, merge_flag, merge_idx, inter_pred_idc, refIdxLX, mvp_Lx_idx, mvdLX), intra prediction parameters (intra_luma_mpm_flag, intra_luma_mpm_idx, intra_luma_mpm_reminder, intra_chroma pred_mode), syntax elements such as quantization transform coefficients, etc.

The entropy coder 104, receives quantization transform coefficients and coding parameters (split information and prediction parameters) input from the parameter coder 111. The entropy coder 104 performs entropy coding on the input quantization transform coefficients and coding parameters to generate a coding stream Te, and outputs the generated coding stream Te.

Figure 13:
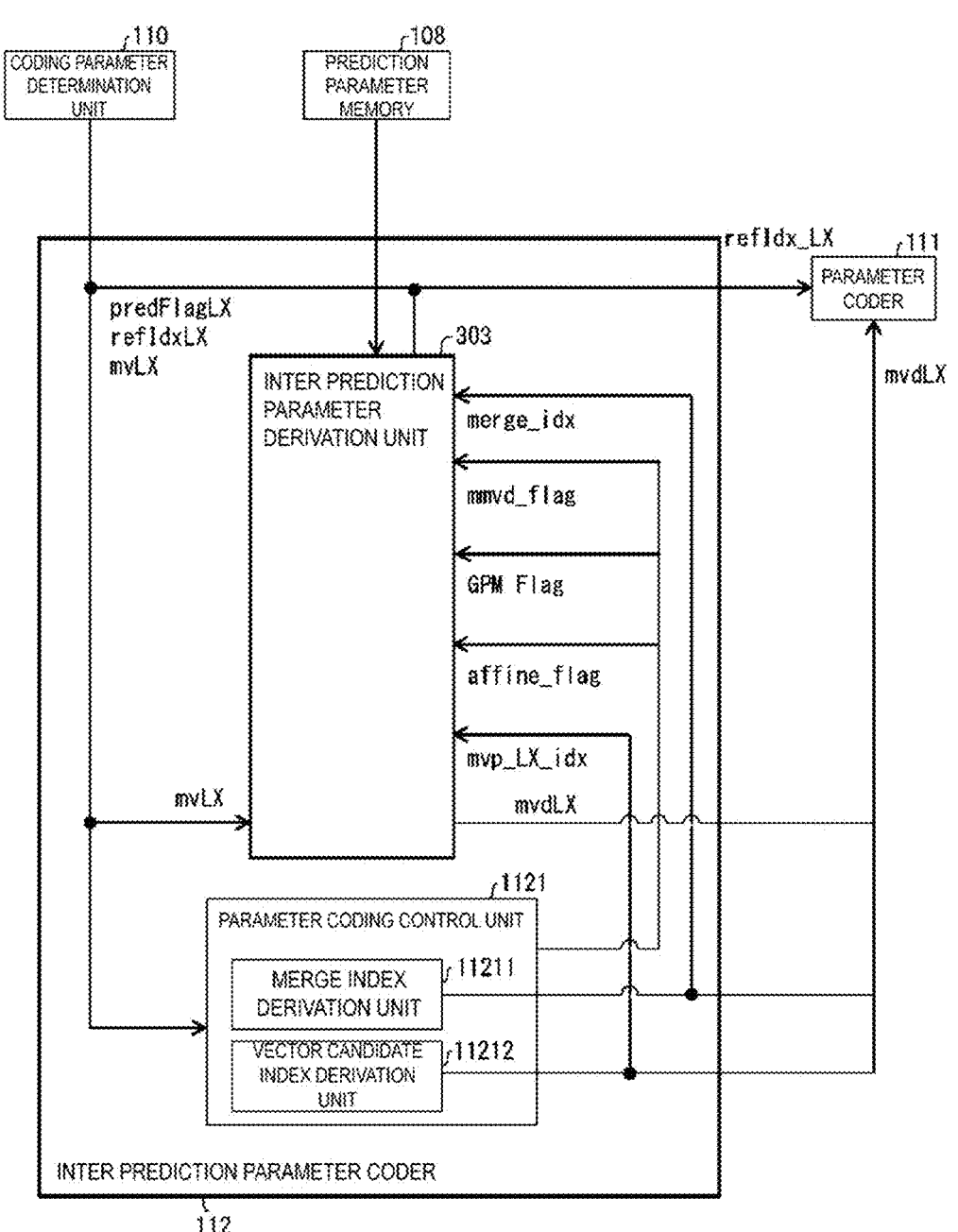
FIG. 13 is a schematic diagram illustrating an inter prediction parameter coder.

The prediction parameter derivation unit 120 is a means including an inter prediction parameter coder 112 and an intra prediction parameter coder 113, and derives intra prediction parameters and intra prediction parameters from parameters input from the coding parameter determination unit 110. The derived intra prediction parameters and intra prediction parameters are output to the parameter coder 111.
Configuration of Inter Prediction Parameter Coder The inter prediction parameter coder 112 includes a parameter coding control unit 1121 and an inter prediction parameter derivation unit 303, as illustrated in FIG. 13. The inter prediction parameter derivation unit 303 is configured in common with a video decoding apparatus. The parameter coding control unit 1121 includes a merge index derivation unit 11211 and a vector candidate index derivation unit 11212.

The merge index derivation unit 11211 derives a merge candidate or the like and outputs the merged candidate to the inter prediction parameter derivation unit 303. The vector candidate index derivation unit 11212 derives a prediction vector candidate or the like, and performs output to the inter prediction parameter derivation unit 303 and the parameter coder 111.
Configuration of Intra Prediction Parameter Coder 113

Figure 14:
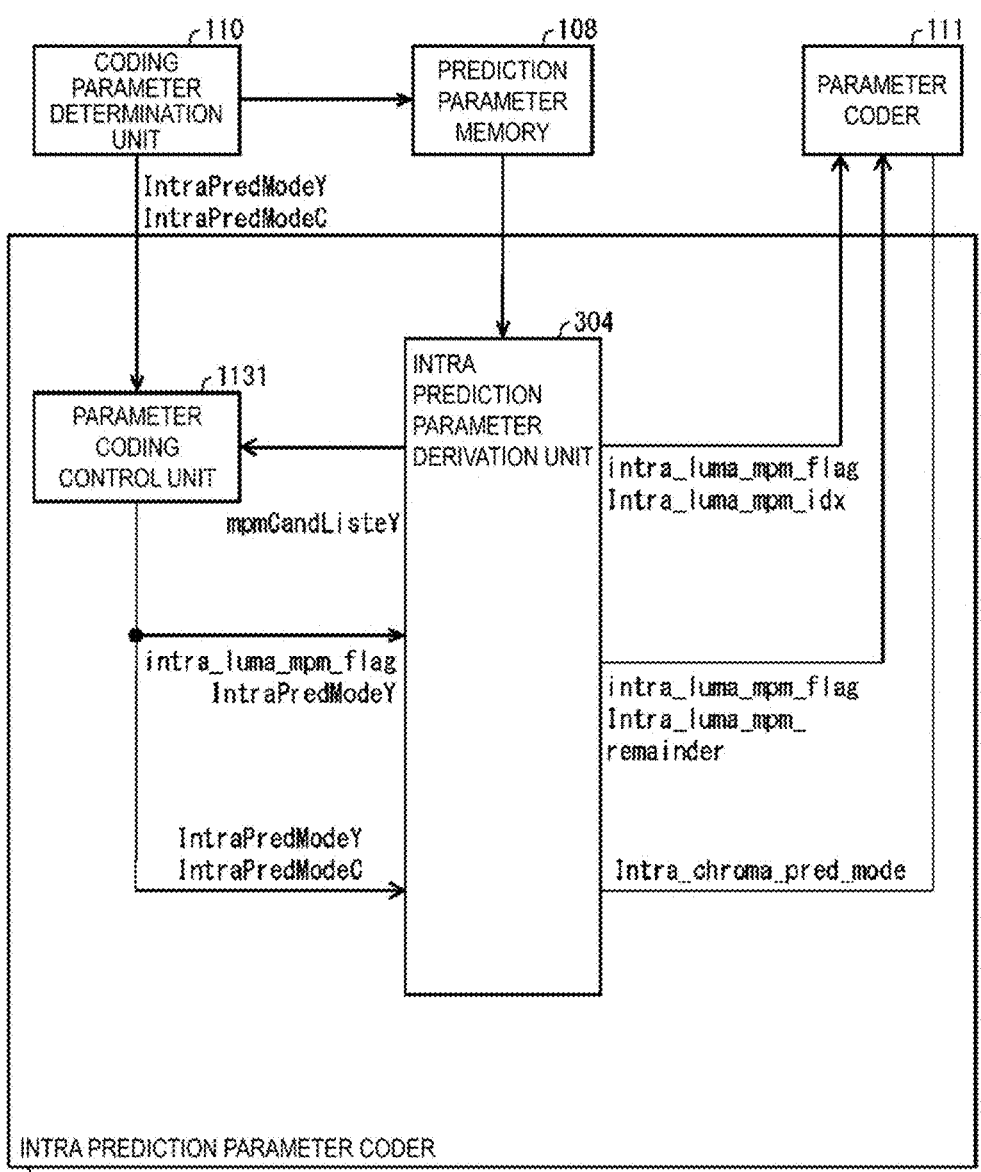
FIG. 14 is a schematic diagram illustrating an intra prediction parameter coder.

As illustrated in FIG. 14, the intra prediction parameter coder 113 includes a parameter coding control unit 1131 and an intra prediction parameter derivation unit 304. The intra prediction parameter derivation unit 304 includes a configuration common to the video decoding apparatus.

The parameter coding control unit 1131 derives IntraPredModeY and IntraPredModeC. Furthermore, mpmCandList[ ] is referenced to determine intra_luma_mpm_flag. These prediction parameters are output to the intra prediction parameter derivation unit 304 and the parameter coder 111.

However, unlike the video decoding apparatus, the inter prediction parameter derivation unit 303 and the intra prediction parameter derivation unit 304 receive inputs from the coding parameter determination unit 110 and the prediction parameter memory 108, and provide outputs to the parameter coder 111.

The addition unit 106 adds, for each pixel, the pixel value of the prediction block input from the prediction image generation unit 101 and the prediction residual input from the inverse quantization and inverse transform processing unit 105 to generate a decoded image. The addition unit 106 stores the decoded image generated in the reference picture memory 109.

The loop filter 107 applies a deblocking filter, SAO, and ALF to the decoded image generated by the addition unit 106. Note that the loop filter 107 need not necessarily include the three types of filters, and may include only a deblocking filter, for example.

The prediction parameter memory 108 stores the prediction parameters generated by the coding parameter determination unit 110 at predetermined positions for each target picture and for each target CU.

The reference picture memory 109 stores the decoded image generated by the loop filter 107 at a predetermined position for each target picture and for each target CU.

The coding parameter determination unit 110 selects one set among multiple sets of coding parameters. Coding parameters refer to the above-described QT, BT, or TT split information, prediction parameters, or parameters to be coded, the parameters being generated in association with the information or prediction parameters. The prediction image generation unit 101 generates a prediction image by using these coding parameters.

The coding parameter determination unit 110 calculates, for each of the multiple sets, an RD cost value indicating the magnitude of an amount of information and a coding error. The RD cost value is, for example, the sum of a code amount and the value obtained by multiplying a coefficient λ by a square error. The code amount is an amount of information of the coding stream Te obtained by performing entropy coding on a quantization error and a coding parameter. The square error is the square sum of prediction residuals calculated in the subtraction unit 102. The coefficient λ is a real number greater than a preconfigured zero. The coding parameter determination unit 110 selects a set of coding parameters for which cost value calculated is a minimum value. The coding parameter determination unit 110 outputs the determined coding parameters to the parameter coder 111 and the prediction parameter derivation unit 120.

Note that a computer may be used to realize parts of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, the parameter coder 111, and the prediction parameter derivation unit 120. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

A part or all of the video coding apparatus 11 and the video decoding apparatus 31 in the embodiments described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present disclosure has been described in detail above referring to the drawings, but the specific configuration is not limited to the above embodiments and various amendments can be made to a design that fall within the scope that does not depart from the gist of the present disclosure.

Syntax

FIG. 15A illustrates a part of a syntax for a Sequence Parameter Set (SPS) in "Versatile Video Coding (Draft 8)," JVET-Q2001-vE, Joint Video Exploration Team (JVET) of ITU-T SG 16 WP 3 and ISO/IEC JTC 1/SC 29/WG 11, 2020 Mar. 12.

sps_weighted_pred_flag is a flag indicating whether the weighted prediction may be applied to P slices referencing the SPS. sps_weighted_pred_flag equal to 1 indicates that the weighted prediction is applied to the P slices referencing the SPS. sps_weighted_pred_flag equal to 0 indicates that no weighted prediction is applied to the P slices referencing the SPS.

sps_weighted_bipred_flag is a flag indicating whether the weighted prediction may be applied to B slice referencing the SPS. sps_weighted_bipred_flag equal to 1 indicates that the weighted prediction is applied to the B slices referencing the SPS. sps_weighted_bipred_flag equal to 0 indicates that no weighted prediction is applied to the B slices referencing the SPS.

long_term_ref_pics_flag is a flag indicating whether a long term picture is used. inter_layer_ref_pics_present_flag is a flag indicating whether an inter-layer prediction is used. sps_idr_rpl_present_flag is a flag that indicates whether the slice header of an IDR picture includes a syntax element of the reference picture list. sps_idr_rpl_present_flag is a flag that indicates whether the slice header of the IDR picture includes a syntax element of the reference picture list. rpl1_same_as_rpl0_flag being 1 indicates that no information is present for reference picture list 1 and that this is the same as num_ref_pic_lists_in_sps[0] and ref_pic_list_struct (0, rplsIdx).

FIG. 15B illustrates a part of a syntax for a Picture Parameter Set (PPS) in "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12.

num_ref_idx_default_active_minus1[i]+1 being 0 indicates the value of a variable NumRefIdxActive[0] for P or B slices in a case of i being 0 and in a case of num_ref_idx_active_override_flag being 0. For i of 1, the parameter indicates the value of a variable NumRefIdxActive[1] for B slices in a case of num_ref_idx_active_override_flag equal to 0. The value of num_ref_idx_default_active_minus1[i] needs to be in the range of 0 to 14.

pps_weighted_pred_flag is a flag indicating whether the weighted prediction is applied to P slices referencing the PPS. pps_weighted_pred_flag equal to 0 indicates that no weighted prediction is applied to the P slices referencing the PPS. pps_weighted_pred_flag equal to 1 indicates that the weighted prediction is applied to the P slices referencing the PPS. When sps_weighted_pred_flag is equal to 0, the weighted prediction unit 3094 sets the value of pps_weighted_pred_flag to 0. In a case that pps_weighted_pred_flag is not present, the value is set to 0.

pps_weighted_bipred_flag is a flag indicating whether the weighted prediction is applied to B slices referencing the PPS. pps_weighted_bipred_flag equal to 0 indicates that no weighted prediction is applied to the B slices referencing the PPS. pps_weighted_bipred_flag equal to 1 indicates that the weighted prediction is applied to the B slices referencing the PPS. When sps_weighted_bipred_flag is equal to 0, the weighted prediction unit 3094 sets the value of pps_weighted_bipred_flag to 0. In a case that pps_weighted_bipred_flag is not present, the value is set to 0.

rpl_info_in_ph_flag equal to 1 indicates that the reference picture list information is present in the picture header. rpl_info_in_ph_flag equal to 0 indicates that no reference picture list information is present in the picture header and a slice header may be present.

In a case that pps_weighted_pred_flag is equal to 1, pps_weighted_bipred_flag is equal to 1 or rpl_info_in_ph_flag is equal to 1, wp_info_in_ph_flag is present. wp_info_in_ph_flag equal to 1 indicates that the weighted prediction information pred_weight_table is present in the picture header and not in the slice header. wp_info_in_ph_flag equal to 0 indicates that the weighted prediction information pred_weight_table is not present in the picture header and may be present in the slice header. In a case that wp_info_in_ph_flag is not present, the value of wp_info_in_ph_flag is equal to 0.

FIG. 16 illustrates a part of a syntax for a picture header PH in "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12.

ph_inter_slice_allowed_flag being 0 indicates that the slice_type of all slices of the picture is 2 (I Slice). ph_inter_slice_allowed_flag being 1 indicates that, the slice in the picture indicates that at least one or more of the slices included in the picture have a slice_type of 0 (B Slice) or 1 (P Slice).

ph_temporal_mvp_enabled_flag is a flag indicating whether to use a temporal motion vector prediction for the inter prediction of the slice associated with PH. In a case that ph_temporal_mvp_enabled_flag is 0, in the slices associated with the PH, the temporal motion vector prediction is not available. Otherwise (in a case that ph_temporal_mvp_enabled_flag is equal to 1), in the slices associated with the PH, the temporal motion vector prediction is available. When not present, the value of ph_temporal_mvp_enabled_flag is inferred to be equal to 0. In a case that the reference picture in DPB does not have the same spatial resolution as that of the current picture, the value of ph_temporal_mvp_enabled_flag is 0. ph_collocated_from_l0_flag being 1 indicates that the reference picture used for the temporal motion vector prediction is specified using reference picture list 0. ph_collocated_from_l0_flag being 0 indicates that the reference picture used for the temporal motion vector prediction is specified using reference picture list 1. ph_collocated_ref_idx indicates the index value of the reference picture used for the temporal motion vector prediction. In a case that ph_collocated_from_l0_flag is 1, ph_collocated_ref_idx needs to reference picture list 0 and the value of ph_collocated_ref_idx needs to range from 0 to num_ref_entries[0][RplsIdx[0]]−1. Additionally, In a case that ph_collocated_from_l0_flag is 0, ph_collocated_ref_idx needs to refer to reference picture list 1 and the value of ph_collocated_ref_idx needs to range from 0 to num_ref_entries[1][RplsIdx[1]]−1. When not present, the value of ph_collocated_ref_idx is inferred to be equal to 0.

In a case that ph_inter_slice_allowed_flag is not 0, and in a case that pps_weighted_pred_flag is equal to 1, pps_weighted_bipred_flag is equal to 1 or wp_info_in_ph_flag is equal to 1, weighted prediction information pred weight_table is present.

FIG. 17A illustrates a part of a syntax for a slice header in "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12.

num_ref_idx_active_override_flag being 1 indicates that the syntax element num_ref_idx_active_minus1[0] is present in P and B slices, and a syntax element num_ref_idx_active_minus1[1] is present in the B slices. num_ref_idx_active_override_flag being 0 indicates that the syntax element num_ref_idx_active_minus1[0] is not present in the P and B slices. When not present, the value of num_ref_idx_active_override_flag is inferred to be equal to 1.

num_ref_idx_active_minus1[i] is used to derive the number of reference pictures in reference picture list i that are actually used. A variable NumRefIdxActive[i], which is the number of reference pictures actually used, is derived in the manner illustrated in FIG. 17B. The value of num_ref_idx_active_minus1[i] needs to be 0 or more and 14 or less. In a case that the slices are B slices and that num_ref_idx_active_override_flag is 1 and that num_ref_idx_active_minus1[i] is not present, num_ref_idx_active_minus1[i] is inferred to be equal to 0.

In a case that the value of ph_temporal_mvp_enabled_flag is 1 and rpl_info_in_ph_flag is not 1, the slice header includes information related to the temporal motion vector prediction. At this time, in a case that the slice_type of the slice is equal to B, the slice_collocated_from_l0_flag is specified. rpl_info_in_ph_flag is a flag indicating that information related to the reference picture list is present in the picture header.

slice_collocated_from_l0_flag being 1 indicates that the reference picture used for the temporal motion vector prediction is derived from reference picture list 0. slice_collocated_from_l0_flag being 0 indicates that the reference picture used for the temporal motion vector prediction is derived from reference picture list 1. In a case that slice_type is equal to B or P, ph_temporal_mvp_enabled_flag is equal to 1 and slice_collocated_from_l0_flag is not present, the following applies: In a case that rpl_info_in_ph_flag is not 1, slice_collocated_from_l0_flag is inferred to be equal to ph_collocated_from_l0_flag. Otherwise (in a case that rpl_info_in_ph_flag is 0 and that slice_type is equal to P), the value of slice_collocated_from_l0_flag is inferred to be equal to 1.

slice_collocated_ref_idx indicates an index specifying the reference picture used for the temporal motion vector prediction. In a case that slice_type is P or B and slice_collocated_from_l0_flag is 1, slice_collocated_ref_idx needs to refer to reference picture list 0, and the value of the slice_collocated_ref_idx needs to be equal to or more than 0 and equal to or less than NumRefIdxActive[0]−1. In a case that slice_type is B and slice_collocated_from_l0_flag is 0, slice_collocated_ref_idx needs to refer to reference picture list 1, and the value of the slice_collocated_ref_idx needs to be 0 or more and NumRefIdxActive[1] needs to be −1 or less.

In a case that slice_collocated_ref_idx is not present, the following applies: In a case that rpl_info_in_ph_flag being 1, the value of slice_collocated_ref_idx is inferred to be equal to the ph_collocated_ref_idx. Otherwise (in a case that rpl_info_in_ph_flag is equal to 0), the value of slice_collocated_ref_idx is inferred to be equal to zero. Additionally, the reference picture indicated by slice_collocated_ref_idx needs be the same for all the slices in the picture. The values of pic_width_in_luma_samples and pic_height_in_luma_samples of the reference picture indicated by slice_collocated_ref_idx need to be equal to the values of pic_width_in_luma_samples and pic_height_in_luma_samples of the current picture, and RprConstraintsActive[slice_collocated_from_l0_flag? 0:1][slice_collocated_ref_idx] needs to be equal to 0.

In a case that wp_info_in_ph_flag does not equal to 1, and pps_weighted_pred_flag equals to 1, and slice_type equals to 1 (P Slice), or in a case that pps_weighted_bipred flag equals to 1 and slice_type equals to 0 (B Slice), pred_weight_table is invoked.

FIG. 17B illustrates a method for deriving a variable NumRefIdxActive[i] in "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12. For reference picture list i (=0, 1), if num_ref_idx_active_override_flag equals to 1 in a case of B slices or reference picture list 0 in P slices, the variable NumRefIdxActive[i] is set equal to the value of num_ref_idx_active_minus1[i] plus 1. Otherwise (num_ref_idx_active_override_flag equal to 0 in a case of B slices or reference picture list 0 in P slices), in a case that the value of num_ref_entries[i][RplsIdx[i]] is equal to or larger than num_ref_idx_default_active_minus1[i] plus 1, a variable NumRefIdxActive[i] is set equal to the value of num_ref_idx_default_active_minus1[i] plus 1, and otherwise the variable NumRefIdxActive[i] is set equal to the value of num_ref_entries[i][RplsIdx[i]]. num_ref_idx_default_active_minus1[i] is the value of the default variable NumRefIdxActive[i] defined in the PPS. In a case of I slices or reference picture list 1 in P slices, the variable NumRefIdxActive[i] is set equal to 0.

FIG. 18 illustrates a syntax for weighted prediction information pred weight_table in "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12.

Here, num_l0_weights indicates the number of weights that are signaled to an entry in the reference picture list 0 in a case that wp_info_in_ph_flag is equal to 1. The value of num_l0_weights is in the range of 0 to min (15, num_ref_entries[0][RplsIdx[0]]. In a case that wp_info_in_ph_flag is equal to 1, the variable NumWeightsL0 is set equal to num_l0_weights. Otherwise (in a case that wp_info_in_ph_flag is equal to 0), NumWeightsL0 is set to NumRefIdxActive[0]. Here, num_ref_entries[i][RplsIdx[i]] indicates the number of reference pictures of the reference picture list i. The variable RplsIdx[i] is an index value indicating a list in which multiple reference picture list i exists.

The num_l1_weights specifies the number of weights that are signaled to an entry in the reference picture list 1 in a case that both pps_weighted_bipred_flag and wp_info_in_ph_flag are equal to 1. The value of num_l1_weights is in a range of 0 to min (15, num_ref_entries[1][RplsIdx[1]]).

In a case that pps_weighted_bipred_flag is 0, the variable NumWeightsL1 is 0, and otherwise in a case that wp_info_in_ph_flag is 1, the variable NumWeightsL1 is set equal to the value of num_l1_weights, otherwise the variable NumWeightsL1 is set equal to NumRefIdxActive[1].

luma_log 2_weight_denom is the binary logarithm of the denominator of the weight coefficients for all luminances as the bottom of 2. The value of luma_log 2_weight_denom needs to range from 0 to 7. delta_chroma_log 2_weight_denom is the difference in the binary logarithm of the denominator of all chroma weight coefficients. In a case that delta_chroma_log 2_weight_denom is not present, delta_chroma_log 2_weight_denom is inferred to be equal to 0. A variable ChromaLog2WeightDenom needs to be derived to be equal to the luma_log 2_weight_denom+delta_chroma_log 2_weight_denom and the value needs to range from 0 to 7.

luma_weight_l0_flag[i] being 1 indicates that a weight coefficient for a luminance component of the L0 prediction is present. luma_weight_l0_flag[i] being 0 indicates that no weight coefficient for the luminance component of the L0 prediction is present. In a case that luma_weight_l0_flag[i] is not present, the weighted prediction unit 3094 infers luma_weight_l0_flag[i] to be equal to 0. chroma_weight_l0_flag[i] being 1 indicates that a weight coefficient for a chroma prediction value of the L0 prediction is present. chroma_weight_l0_flag[i] being 0 indicates that no weight coefficient for the chroma prediction value of the L0 prediction is present. In a case that chroma_weight_l0_flag[i] is not present, the weighted prediction unit 3094 infers chroma_weight_l0_flag[i] to be equal to 0.

delta_luma_weight_l0[i] is a difference in weight coefficients applied to a luminance prediction value for an L0 prediction using RefPicList[0][i]. A variable LumaWeightL0[i] is derived to be equal to (1<<luma_log 2_weight_denom)+delta_luma_weight_l0[i]. In a case that luma_weight_l0_flag[i] is equal to 1, the value of delta_luma_weight_l0[i] needs to range from −128 to 127. In a case that luma_weight_l0_flag[i] is equal to 0, the weighted prediction unit 3094 infers LumaWeightL0[i] to be equal to the exponential value of luma_log 2_weight_denom of 2 (2^luma_log 2_weight_denom).

luma_offset_l0[i] is an offset value applied to a luminance prediction value for an L0 prediction using RefPicList[0][i]. The value of luma_offset_l0[i] needs to range from −128 to 127. In a case that luma_weight_l0_flag[i] is equal to 0, the weighted prediction unit 3094 infers luma_offset_l0[i] to be equal to zero.

delta_chroma_weight_l0[i][j] is a difference in weight coefficients applied to a chroma prediction value for an L0 prediction using RefPicList0[i] where j is 0 for Cb and j is 1 for Cr. A variable ChromaWeightL0[i][j] is derived to be equal to (1<<ChromaLog2WeightDenom)+delta_chroma_weight_l0[i][j]. When chroma_weight_l0_flag[i] is equal to 1, the value of delta_chroma_weight_l0[i][j] needs to range from −128 to 127. In a case that chroma_weight_l0_flag[i] is 0, the weighted prediction unit 3094 infers ChromaWeightL0[i][j] to be equal to the exponential value of ChromaLog2WeightDenom of 2 (2^ChromaLog2WeightDenom). delta_chroma_offset_l0[i][j] is a difference in offset values applied to the chroma prediction value for the L0 prediction using RefPicList0[i] where j is 0 for Cb and j is 1 for Cr. The variable ChromaOffsetL0[i][j] are derived as follows:

$$\text{ChromaOffsetL0}[i][j]=\text{Clip3}(-128,127, (128+\text{delta\_chroma\_offset\_l0}[i][j]-((128*\text{ChromaWeightL0}[i][j]>>\text{ChromaLog2WeightDenom}))$$

The values of delta_chroma_offset_l0[i][j] needs to range from, −4*128 to 4*127. In a case that chroma weight_l0_flag[i] equal to 0, the weighted prediction unit 3094 infers ChromaOffsetL0[i][j] to be equal to zero.

Note that luma_weight_l1_flag[i], chroma_weight_l1_flag[i], delta_luma_weight_l1[i], luma_offset_l1[i]; delta_chroma_weight_l1[i][j] and delta_chroma_offset_l1[i][j] are respectively replaced with luma_weight_l0_flag[i], chroma_weight_l0_flag[i], delta_luma_weight_l0[i], luma_offset_l0[i][j], delta_chroma_weight_l0[i][j], and delta_chroma_offset_l0[i] for interpretation, and l0, L0, list0 and List0 are respectively replaced with l1, l1, list1 and List1 for interpretation.

FIG. 19A illustrates a syntax for ref_pic_lists( ) defining a reference picture list in "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12. ref_pic_lists( ) may be present in the picture header or the slice header. rpl_sps_flag[i] being 1 indicates that a reference picture list i of ref_pic_lists( ) is derived based on one of the ref_pic_list_struct(listIdx, rplsIdx) in the SPS. Here, listIdx is equal to i.

rpl_sps_flag[i] being 0 indicates that the reference picture list i is derived based on ref_pic_list_struct(listIdx, rplsIdx). Here, listIdx is equal to i, which is directly included in ref pic lists( ). In a case that rpl_sps_flag[i] is not present, the following applies: In a case that num_ref_pic_lists_in_sps[i] is 0, the value of rpl_sps_flag[i] is inferred to be 0. In a case that num_ref_pic_lists_in_sps[i] is greater than zero, rpl1_idx_present_flag is 0, and i is equal to 1, the value of rpl_sps_flag[1] is inferred to be equal to the value of rpl_sps_flag[0].

rpl_idx[i] indicates the index of ref_pic_list_struct(listIdx, rplsIdx). ref_pic_list_struct(listIdx, rplsIdx) is used to derive reference picture i. Here, listIdx is equal to i. When not present, the value of rpl_idx[i] is inferred to be equal to 0. The value of rpl_idx[i] is in the range of 0 to num_ref_pic_lists_in_sps[i]−1. In a case that rpl_sps_flag[i] is 1 and num_ref_pic_lists_in_sps[i] is 1, the value of rpl_idx[i] is inferred to be equal to 0. In a case that rpl_sps_flag[i] is 1 and rpl1_idx_present_flag is 0, the value of rpl_idx[i] is inferred to be equal to rpl_idx[0]. A variable RplsIdx[i] is derived as follows:

$$RplsIdx[i]=(rpl\_sps\_flag[i])?\ rpl\_idx[i]:\ num\_ref\_pic\_lists\_in\_sps[i]$$

FIG. 19B illustrates a syntax defining a reference picture list structure ref_pic_list_struct(listIdx, rplsIdx) in "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12.

ref_pic_list_struct(listIdx, rplsIdx) may be present in the SPS, picture header, or slice header. The following applies depending on whether the syntax is included in the SPS, the picture header, or the slice header: In a case that the syntax is present in the picture or slice header, ref_pic_list_struct (listIdx, rplsIdx) indicates the reference image list listIdx of the current picture (picture including the slice). In a case that the syntax is present in the SPS, ref_pic_list_struct(listIdx, rplsIdx) indicates a candidate for the reference picture list listIdx. For the current picture, reference from the picture header or the slice header to the list of ref_pic_list_struct (listIdx, rplsIdx) included in the SPS is enabled using an index value.

Here, num_ref_entries[listIdx][rplsIdx] indicates the number of ref_pic_list_struct(listIdx, rplsIdx). num_ref_entries[listIdx][rplsIdx] is in the range of 0 to MaxDpbSize+13. MaxDpbSize is the number of decoded pictures determined by a profile level.

ltrp_in_header_flag[listIdx][rplsIdx] is a flag that indicates whether a long term reference picture is present in ref_pic_list_struct(listIdx, rplsIdx).

inter_layer_ref_pic_flag[listIdx][rplsIdx][i] is a flag indicating whether the i-th in the reference picture list of ref_pic_list_struct(listIdx, rplsIdx) is an inter-layer prediction or not.

st_ref_pic_flag[listIdx][rplsIdx][i] is a flag indicating whether the i-th in the reference picture list of ref_pic_list_struct(listIdx, rplsIdx) is a short-term reference picture.

abs_delta_poc_st[listIdx][rplsIdx][i] is a syntax element for deriving the absolute difference value of the POC of the short-term reference picture.

strp_entry_sign_flag[listIdx][rplsIdx][i] is a flag for deriving a positive sign or a negative sign.

rpls_poc_lsb_lt[listIdx][rplsIdx][i] is a syntax element for deriving the POC of the i-th long term reference picture in the reference picture list of ref_pic_list_struct(listIdx, rplsIdx).

The ilrp_idx[listIdx][rplsIdx][i] is a syntax element for deriving the layer information of the reference picture for the i-th inter-layer prediction of the reference picture list of ref_pic_list_struct(listIdx, rplsIdx).

As a problem with a method described in "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12, 0 may be designated as the value of num_ref_entries[listIdx][rplsIdx] of the reference picture list structure ref_pic_list_struct(listIdx, rplsIdx) as illustrated in FIG. 19B. 0 indicates that the number of reference pictures in the reference picture list listIdx of pic_list_struct indicated by rplsIdx is 0. num_ref_entries can be specified regardless of the slice_type. For reference picture list 0 for P slices or for B slices, the number of reference pictures present in the reference picture list is at least one or more, and specification of 0 leads to an indefinite reference picture due to the lack of a picture to be referenced.

Thus, in the present embodiment, the syntax element to be notified is num_ref_entries_minus1[listIdx][rplsIdx] instead of num_ref_entries[listIdx][rplsIdx], and num_ref_entries_minus1[listIdx][rplsIdx] is in the range of 0 to MaxDpbSize+14, as illustrated in FIG. 20. In this way, the reference picture can be prevented from being indefinite by optionally inhibiting the number of reference pictures from being set to 0.

Additionally, another problem with the method described in "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12, in pred_weight_table in FIG. 18, num_l0_weights and num_l1_weights are explicitly described as a syntax to describe the number of weights in reference picture list 0 and reference picture list 1. At the time when the pred_weight_table is invoked in the picture header, the number of reference pictures in the reference picture list i is already defined by ref_pic list_struct(listIdx, rplsIdx). Thus, this syntax element is redundant. Additionally, at the time when pred_weight_table is invoked in the slice header, the number of reference pictures in the reference picture list i is already defined by NumRefIdxActive[i]. Thus, this syntax element is redundant. Accordingly, in the present embodiment, before pred_weight_table is invoked in the picture header, the variable NumWeightsL0 is set equal to the value of num_ref_entries_minus1[0][RplsIdx[0]]+1, as in FIG. 21A. Then, in a case that pps_weighted_bipred_flag is 1, the variable NumWeightsL1 is set equal to the value of num_ref_entries_minus1[1][RplsIdx[1]]+1, and otherwise the variable NumWeightsL1 is set equal to 0. This is because, in a case that pps_weighted_bipred_flag is 0, no weighted prediction for the bi-directional prediction is present. Additionally, as in FIG. 21B, before pred_weight_table is invoked in the slice header, the variable NumWeightsL0 is set equal to the value of the variable NumRefIdxActive[0] and the variable NumWeightsL1 is set equal to the value of the variable NumRefIdxActive[1]. Incidentally, the value of the variable NumRefIdxActive[1] in the P slice is 0. As in FIG. 22, for pred_weight_table, redundancy can be eliminated by avoiding explicitly describing num_l0_weights and num_l1_weights as a syntax, and using the variable Num- WeightsL0 for the number of weights in reference picture list 0 and using the variable NumWeightsL1 for reference picture list 1.

FIG. 23 is an example of another embodiment of the present embodiment. In this example, the variable NumWeightsL0 and the variable NumWeightsL1 are defined in pred_weight_table. In a case that wp_info_in_ph_flag is equal to 1, the variable NumWeightsL0 is set equal to the value of num_ref_entries[0][PicRplsIdx[0]], and otherwise the variable NumWeightsL0 is set equal to the value of the variable NumRefIdxActive[0]. wp_info_in_ph_flag is a flag indicating that the weighted prediction information is present in the picture header.

Additionally, in a case that wp_info_in_ph_flag is equal to 1 and pps_weighted_bipred_flag is equal to 1, the variable NumWeightsL1 is set equal to the value of num_ref_entries [1][PicRplsIdx[1]]. pps_weighted_bipred_flag is a flag indicating that a bi-directional weighted prediction is performed. In a case that wp_info_in_ph_flag is equal to 1 and pps_weighted_bipred_flag is 0, the variable NumWeightsL1 is set equal to 0. In a case that wp_info_in_ph_flag is equal to 0, NumWeightsL1 is set equal to the value of variable NumRefIdxActive[1]. In this way, redundancy can be eliminated by avoiding explicitly describing num_l0_weights and num_l1_weights in syntax, and using the variable NumWeightsL0 for the number of weights in reference picture list 0 and using the variable NumWeightsL1 for the number of weights in reference picture list 1.

As another problem with the method described in "Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12, the number of active reference pictures is defined in the slice header but not in the picture header.

Thus, in another embodiment of the present embodiment, the number of active reference pictures can also defined in the picture header as illustrated in FIG. 24A. In a case that ph_inter_slice_allowed_flag is equal to 1 and rpl_info_in_ph_flag is equal to 1, the number of active reference pictures is defined. ph_inter_slice_allowed_flag being 1 indicates that a P slice or a B slice may be present in the picture. rpl_info_in_ph_flag equal to 1 indicates that reference picture list information is present in the picture header.

ph_num_ref_idx_active_override_flag is a flag indicating whether ph_num_ref_idx_active_minus1[0] and ph_num_ref_idx_active_minus1[1] are present.

ph_num_ref_idx_active_minus1[i] indicates a syntax element used to derive the variable NumRefIdxActive[i] for the reference picture list i, having a value of 0 or more and 14 or less.

ph_collocated_ref_idx indicates the index of the reference picture used for the temporal motion vector prediction. In a case that ph_collocated_from_l0_flag is 1, ph_collocated_ref_idx references reference picture list 0, and the value of ph_collocated_ref_idx is in the range of 0 to NumRefIdxActive[0]−1. In a case that ph_collocated_from_l0_flag is 0, ph_collocated_ref_idx refers an entry of reference picture list 1 and the value of ph_collocated_ref_idx is the in the range of 0 to NumRefIdxActive[1]−1. When not present, the value of ph_collocated_ref_idx is inferred to be equal to 0.

FIG. 24B illustrates a method for deriving the variable NumRefIdxActive[i]. For reference picture list i (=0, 1), In a case that ph_num_ref_idx_active_override_flag is 1, the variable NumRefIdxActive[i] is set equal to the value of ph_num_ref_idx_active_minus1[i] plus 1 in a case that num_ref_entries_minus1[i][RplsIdx[i]] is larger than 0. Otherwise, the variable NumRefIdxActive[i] is set equal to 1. On the other hand, in a case that ph_num_ref_idx_active_override_flag is not 1 and that the value of num_ref_entries_minus1[i][RplsIdx[i]] is equal to or larger than num_ref_idx_default_active_minus1[i] plus 1, the variable NumRefIdxActive[i] is set equal to the value of num_ref_idx_default_active_minus1[i] plus one. Otherwise, the variable NumRefIdxActive[i] is set equal to the value of num_ref_entries_minus1[i][RplsIdx[i]] plus 1. num_ref_idx_default_active_minus1[i] is the value of the default variable NumRefIdxActive[i] defined in the PPS.

FIG. 25A is a syntax for the slice header. In the slice header, in a case that rpl_info_in_ph_flag indicating that the reference picture list information is present in the picture header is not 1, and in the case of P or B slices, the number of active reference pictures is defined.

FIG. 25B illustrates how the variable NumRefIdxActive [i] is derived in this case. For the reference picture list i (=0, 1), in a case that rpl_info_in_ph_flag is not 1 and i is 0 in the B slices or the P slices, the variable NumRefIdxActive[i] is rewritten. In a case that num_ref_idx_active_override_flag is 1, the variable NumRefIdxActive[i] is set equal to the value of num_ref_idx_active_minus1[i] plus 1 in a case that num_ref_entries_minus1[i][RplsIdx[i]] is larger than 0, and otherwise the variable NumRefIdxActive[i] is set equal to 1. In a case that num_ref_idx_active_override_flag is not 1, the variable NumRefIdxActive[i] is set equal to the value of num_ref_idx_default_active_minus1[i] plus 1 in a case that the value of num_ref_entries_minus1[i][RplsIdx[i]] is equal to or larger than num_ref_idx_default_active_minus1[i] plus 1, and otherwise the variable NumRefIdxActive[i] is set equal to the value of num_ref_entries_minus1[i][RplsIdx[i]] plus 1. In a case that i is 1 in I slices or P slices, the variable NumRefIdxActive[i] is set equal to 0 regardless of the value of rpl_info_in_ph_flag. rpl_info_in_ph_flag is a flag indicating that the reference picture list information is present in the picture header. num_ref_idx_default_active_minus1[i] is the value of the default variable NumRefIdxActive[i] defined in the PPS.

As in FIG. 26, for pred_weight_table, redundancy can be eliminated by avoiding explicitly describing num_l0_weights and num_l1_weights as a syntax, and using the variable NumRefIdxActive[0] for the number of weights in reference picture list 0 and using the variable NumRefIdxActive[1] for the number of weights in reference picture list 1.

APPLICATION EXAMPLES

The above-mentioned video coding apparatus 11 and the video decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

At first, referring to FIG. 2, it will be described that the above-mentioned video coding apparatus 11 and the video decoding apparatus 31 can be utilized for transmission and reception of videos.

Figure 2:
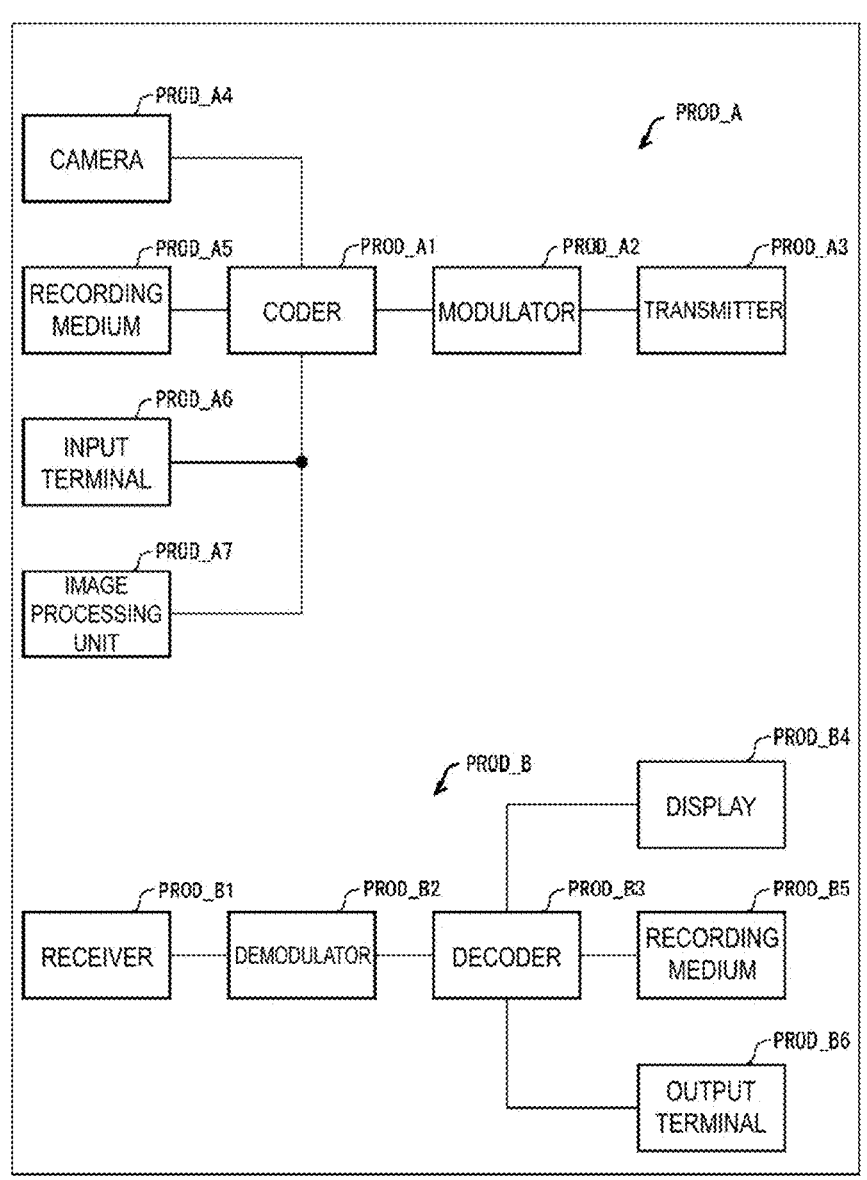
FIG. 2 is a diagram illustrating configurations of a transmitting apparatus equipped with a video coding apparatus and a receiving apparatus equipped with a video decoding apparatus according to the present embodiment. PROD_A illustrates the transmitting apparatus equipped with the video coding apparatus, and PROD_B illustrates the receiving apparatus equipped with the video decoding apparatus.

PROD_A in FIG. 2 is a block diagram illustrating a configuration of a transmitting apparatus PROD_A installed with the video coding apparatus 11. As illustrated in FIG. 2, the transmitting apparatus PROD_A includes an coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmitting apparatus PROD_A includes all of the constituents is illustrated in FIG. 2, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

PROD_B in FIG. 2 is a block diagram illustrating a configuration of a receiving apparatus PROD_B installed with the video decoding apparatus 31. As illustrated in FIG. 2, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in FIG. 2, some of the constituents may be omitted.

Note that the recording medium PROD_B5 may record videos which are not coded, or may record videos which are coded in a coding scheme for recording different from a coding scheme for transmission. In the latter case, an coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Next, referring to FIG. 3, it will be described that the above-mentioned video coding apparatus 11 and the video decoding apparatus 31 can be utilized for recording and regeneration of videos.

Figure 3:
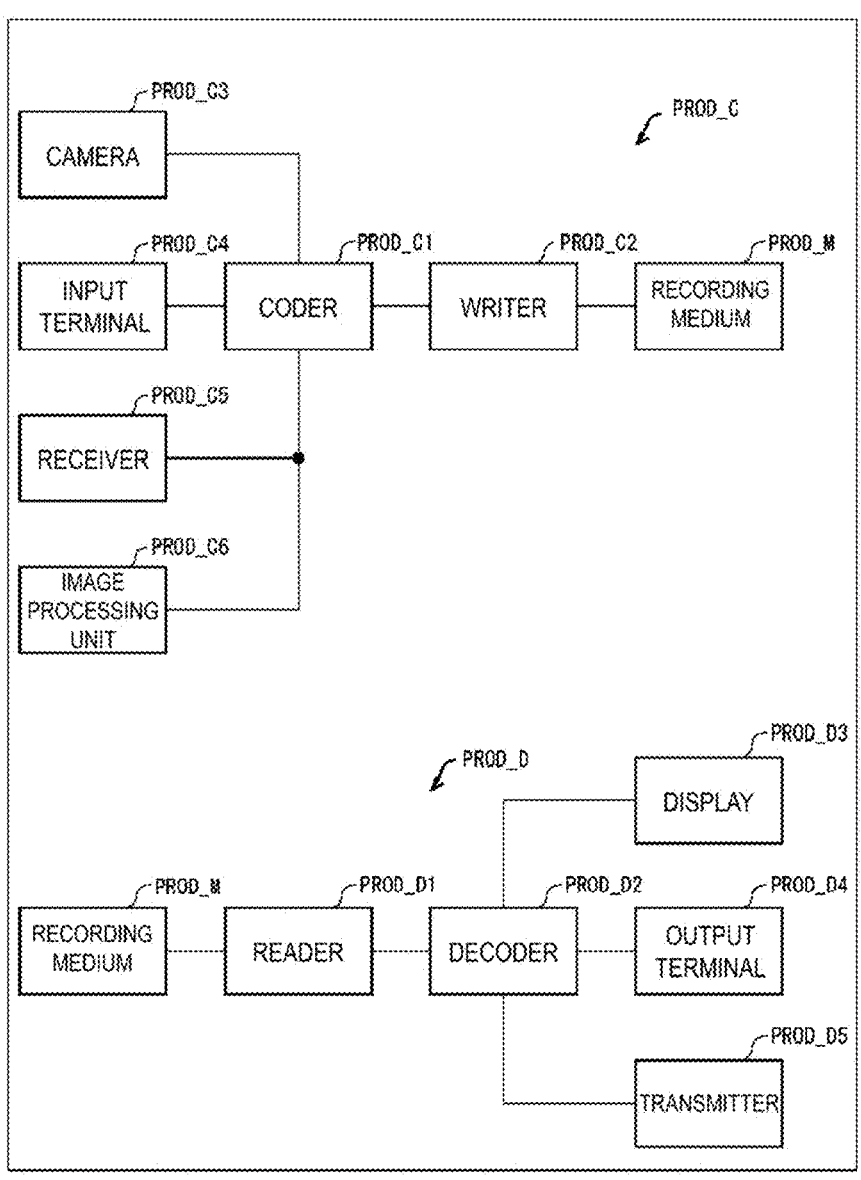
FIG. 3 is a diagram illustrating configurations of a recording apparatus equipped with the video coding apparatus and a reconstruction apparatus equipped with the video decoding apparatus according to the present embodiment. PROD_C illustrates the recording apparatus equipped with the video coding apparatus, and PROD_D illustrates the reconstruction apparatus equipped with the video decoding apparatus.

PROD_C in FIG. 3 is a block diagram illustrating a configuration of a recording apparatus PROD_C installed with the above-mentioned video coding apparatus 11. As illustrated in FIG. 3, the recording apparatus PROD_C includes an coder PROD_C1 that obtains coded data by coding a video, and a writing unit PROD_C2 that writes the coded data obtained by the coder PROD_C1 in a recording medium PROD_M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD, trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in FIG. 3, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

PROD_D in FIG. 3 is a block diagram illustrating a configuration of a reconstruction apparatus PROD_D installed with the above-mentioned video decoding apparatus 31. As illustrated in FIG. 3, the reconstruction apparatus PROD_D includes a reading unit PROD_D1 which reads coded data written in the recording medium PROD_M, and a decoder PROD_D2 which obtains a video by decoding the coded data read by the reader PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in FIG. 3, some of the constituents may be omitted.

Note that the transmitter PROD_D5 may transmit a video which is not coded or may transmit coded data coded in the coding scheme for transmission different from a coding scheme for recording. In the latter case, an coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each apparatus includes a CPU performing a command of a program to implement each function, a Read Only Memory (ROM) stored in the program, a Random Access Memory (RAM) developing the program, and a storage apparatus (recording medium) such as a memory storing the program and various data, and the like. In addition, an objective of the embodiments of the present disclosure can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or a MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD, trade name)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/ Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present disclosure can be also realized in the form of computer data signals embedded in a carrier such that the transmission of the program codes is embodied in electronic transmission.

The embodiments of the present disclosure are not limited to the above-described embodiments, and various modifications are possible within the scope of the claims. That is, an embodiment obtained by combining technical means modified appropriately within the scope defined by claims is included in the technical scope of the present disclosure as well.

INDUSTRIAL APPLICABILITY

The embodiments of the present disclosure can be preferably applied to a video decoding apparatus that decodes coded data in which image data is coded, and a video coding apparatus that generates coded data in which image data is coded. The embodiments of the present disclosure can be preferably applied to a data structure of coded data generated by the video coding apparatus and referenced by the video decoding apparatus.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A video decoding apparatus comprising:
a parameter decoding circuit configured to:
  decode a first syntax element, from a picture parameter set, indicating a value of a variable NumRefIdxActive[1] for B slices with a first flag equal to 0,
  decode a second flag, from the picture parameter set, indicating whether or not a weighted prediction is applied to the B slices referring to the picture parameter set,
  decode a third flag, from the picture parameter set, indicating whether weighted prediction information is present in a picture header or in a slice header,
  decode the first flag, from the slice header, wherein the first flag equal to 0 specifies that a second syntax element is not present,
  decode the second syntax element, from the slice header, used to derive the variable NumRefIdxActive[1],
  decode a third syntax element, from a weighted prediction table, for deriving a weight coefficient,
  decode a fourth syntax element, from the weighted prediction table, indicating a number of weights signaled for entries in a reference picture list 1, and
  decode a fifth syntax element, from a reference picture list structure, indicating a number of entries in the reference picture list structure; and
a weighted prediction circuit configured to derive the weight coefficient and generate a prediction image by using the weight coefficient,
  wherein the parameter decoding circuit sets the variable NumRefIdxActive[1] to be equal to a value of the second syntax element plus 1 in a case that a value of the first flag is equal to 1,
  the parameter decoding circuit sets the variable NumRefIdxActive[1] to be equal to a value of the first syntax element plus 1 in a case that the value of the first flag is equal to 0 and a value of the fifth syntax element is greater than or equal to the value of the first syntax element plus 1,
  the parameter decoding circuit sets the variable NumRefIdxActive[1] to be equal to the value of the fifth syntax element in a case that the value of the first flag is equal to 0 and the value of the fifth syntax element is less than the value of the first syntax element plus 1, the weighted prediction circuit sets a variable NumWeightsL1 to be equal to 0 in a case that the second flag indicates that the weighted prediction is applied to the B slices, the third flag indicates that the weighted prediction information is present in the picture header, and the value of the fifth syntax element is equal to 0,
  the weighted prediction circuit sets the variable NumWeightsL1 to be equal to a value of the fourth syntax element otherwise if the third flag indicates that the weighted prediction information is present in the picture header,
  the weighted prediction circuit sets the variable NumWeightsL1 to be equal to a value of the variable NumRefIdxActive[1] else if the third flag indicates the weighted prediction information is present in the slice header,
  the parameter decoding circuit further decodes a sixth syntax element, from the weighted prediction table based on the variable NumWeightsL1, indicating a difference of the weight coefficient applied to a luma prediction value, and
  the weighted prediction circuit derives the weight coefficient by using the third syntax element and the sixth syntax element.

2. A video coding apparatus comprising:
a parameter coding circuit configured to:
  code a first syntax element, into a picture parameter set, indicating a value of a variable NumRefIdxActive[1] for B slices with a first flag equal to 0,
  code a second flag, into the picture parameter set, indicating whether or not a weighted prediction is applied to the B slices referring to the picture parameter set,
  code a third flag, into the picture parameter set, indicating whether weighted prediction information is present in a picture header or in a slice header,
  code the first flag, into the slice header, wherein the first flag equal to 0 specifies that a second syntax element is not present,
  code the second syntax element, into the slice header, used to derive the variable NumRefIdxActive[1],
  code a third syntax element, into a weighted prediction table, for deriving a weight coefficient,
  code a fourth syntax element, into the weighted prediction table, indicating a number of weights signaled for entries in a reference picture list 1, and
  code a fifth syntax element, into a reference picture list structure, indicating a number of entries in the reference picture list structure; and
a weighted prediction circuit configured to derive the weight coefficient and generate a prediction image by using the weight coefficient,
  wherein the parameter coding circuit sets the variable NumRefIdxActive[1] to be equal to a value of the second syntax element plus 1 in a case that a value of the first flag is equal to 1,
  the parameter coding circuit sets the variable NumRefIdxActive[1] to be equal to a value of the first syntax element plus 1 in a case that the value of the value of the first flag is equal to 0 and a value of the fifth syntax element is greater than or equal to the value of the first syntax element plus 1,
  the parameter coding circuit sets the variable NumRefIdxActive[1] to be equal to the value of the fifth syntax element in a case that the value of the first flag is equal to 0 and the value of the fifth syntax element is less than the value of the first syntax element plus 1, the weighted prediction circuit sets a variable NumWeightsL1 to be equal to 0 in a case that the second flag indicates that the weighted prediction is applied to the B slices, the third flag indicates that the weighted prediction information is present in the picture header, and the value of the fifth syntax element is equal to 0, the weighted prediction circuit sets the variable NumWeightsL1 to be equal to a value of the fourth syntax element otherwise if the third flag indicates that the weighted prediction information is present in the picture header, the weighted prediction circuit sets the variable Num WeightsL1 to be equal to a value of the variable NumRefIdxActive[1] else if the third flag indicates the weighted prediction information is present in the slice header, the parameter coding circuit further codes a sixth syntax element, into the weighted prediction table based on the variable Num WeightsL1, indicating a difference of the weight coefficient applied to a luma prediction value, and the weighted prediction circuit derives the weight coefficient by using the third syntax element and the sixth syntax element.

3. A non-transitory computer-readable medium storing one or more instructions for causing an electronic device to decode a video, the one or more instructions, when executed by at least one processor of the electronic device, causing the electronic device to:

generate a picture parameter set, wherein the picture parameter set includes:

a first syntax element, wherein the first syntax element indicates a value of a variable NumRefIdxActive[1] for B slices with a first flag equal to 0, a second flag, wherein the second flag indicates whether or not a weighted prediction is applied to the B slices referring to the picture parameter set, and a third flag, wherein the third flag indicates whether weighted prediction information is present in a picture header or in a slice header, generate the slice header, wherein the slice header includes:

the first flag, wherein the first flag equal to 0 specifies that a second syntax element is not present, and the second syntax element, wherein the second syntax element is used to derive the variable NumRefIdxActive[1];

generate a weighted prediction table, wherein the weighted prediction table includes:

a third syntax element, wherein the third syntax element is used for deriving a weight coefficient, a fourth syntax element, wherein the fourth syntax element indicates a number of weights signaled for entries in a reference picture list 1, and a sixth syntax element, wherein the sixth syntax element is a syntax element based on a variable NumWeightsL1, and that indicates a difference of the weight coefficient applied to a luma prediction value, generate a reference picture list structure, wherein the reference picture list structure includes a fifth syntax element, wherein the fifth syntax element indicates a number of entries in the reference picture list structure;

derive the weight coefficient by using the third syntax element and the sixth syntax element; and generate a prediction image by using the weight coefficient, wherein the variable NumRefIdxActive[1] is set to be equal to a value of the second third syntax element plus 1 in a case that a value of the first flag is equal to 1, the variable NumRefIdxActive[1] is set to be equal to a value of the first syntax element plus 1 in a case that the value of the first flag is equal to 0 and a value of the fifth second syntax element is greater than or equal to the value of the first syntax element plus 1, the variable NumRefIdxActive[1] is set to be equal to the value of the fifth syntax element in a case that the value of the first flag is equal to 0 and the value of the fifth syntax element is less than the value of the first syntax element plus 1, the variable NumWeightsL1 is set to be equal to 0 in a case that the second flag indicates that the weighted prediction is applied to the B slices, the third flag indicates that the weighted prediction information is present in the picture header, and the value of the fifth syntax element is equal to 0, the variable NumWeightsL1 is set to be equal to a value of the fourth syntax element otherwise if the third flag indicates that the weighted prediction information is present in the picture header, and the variable NumWeightsL1 is set to be equal to a value of the variable NumRefIdxActive[1] else if the third flag indicates the weighted prediction information is present in the slice header.

* * * * *